United States Patent
Matsumoto et al.

(10) Patent No.: US 7,346,286 B2
(45) Date of Patent: Mar. 18, 2008

(54) METHOD AND APPARATUS FOR IMAGE FORMING EFFECTIVELY DETECTING DETERIORATION OF DEVELOPER

(75) Inventors: Junichi Matsumoto, Yokohama (JP); Nobuo Iwata, Sagamihara (JP); Satoshi Muramatsu, Tokyo (JP); Nobutaka Takeuchi, Yokohama (JP); Takayuki Koike, Yokohama (JP); Eriko Maruyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 11/155,827

(22) Filed: Jun. 20, 2005

(65) Prior Publication Data

US 2006/0008281 A1    Jan. 12, 2006

(30) Foreign Application Priority Data

Jun. 18, 2004    (JP)    ............................. 2004-180565
Feb. 24, 2005    (JP)    ............................. 2005-049206

(51) Int. Cl.
*G03G 15/08*    (2006.01)
(52) U.S. Cl. ........................................ 399/29; 399/259
(58) Field of Classification Search ................. 399/27, 399/29, 30, 58, 60, 61, 62, 63, 64, 258, 259
See application file for complete search history.

(56) References Cited

U.S. PATENT DOCUMENTS

| | | | |
|---|---|---|---|
| 5,548,385 A * | 8/1996 | Takai et al. ..................... 399/62 |
| 5,638,159 A | 6/1997 | Kai et al. | |
| 5,778,279 A * | 7/1998 | Kawai et al. ............. 399/27 X |
| 5,797,074 A | 8/1998 | Kasahara et al. | |
| 5,815,784 A | 9/1998 | Kasahara et al. | |
| 5,953,567 A | 9/1999 | Muramatsu et al. | |
| 5,987,298 A | 11/1999 | Muramatsu et al. | |
| 6,201,941 B1 | 3/2001 | Kasahara et al. | |
| 6,393,241 B1 | 5/2002 | Matsumoto et al. | |
| 6,567,637 B2 | 5/2003 | Yanagisawa et al. | |
| 6,571,076 B2 | 5/2003 | Kasahara et al. | |
| 6,597,883 B2 | 7/2003 | Muramatsu et al. | |
| 6,628,908 B2 | 9/2003 | Matsumoto et al. | |
| 6,628,915 B2 | 9/2003 | Muramatsu et al. | |
| 6,748,190 B2 | 6/2004 | Yanagisawa et al. | |
| 6,826,381 B2 | 11/2004 | Muramatsu et al. | |
| 6,882,812 B2 | 4/2005 | Kasahara et al. | |

(Continued)

FOREIGN PATENT DOCUMENTS

JP    53-049439    5/1978

(Continued)

OTHER PUBLICATIONS

U.S. Appl. No. 10/738,028, filed Dec. 18, 2003, Muramatsu et al.

(Continued)

*Primary Examiner*—Sandra L. Brase
(74) *Attorney, Agent, or Firm*—Oblon, Spivak, McClelland, Maier & Neustadt, P.C.

(57) ABSTRACT

A developer container includes a developer container configured to contain a developer including a toner and a carrier, a developer delivering mechanism configured to deliver the developer toward an image bearing member of an image forming apparatus, and a detecting mechanism configured to detect deterioration of the developer based on a predetermined characteristic of the developer.

40 Claims, 12 Drawing Sheets

U.S. PATENT DOCUMENTS

| | | |
|---|---|---|
| 6,898,405 B2 | 5/2005 | Matsumoto et al. |
| 2003/0235436 A1 | 12/2003 | Kasahara et al. |
| 2004/0013963 A1 | 1/2004 | Muramatsu et al. |
| 2004/0091287 A1 | 5/2004 | Matsumoto et al. |
| 2004/0197119 A1 | 10/2004 | Matsumoto et al. |
| 2005/0163537 A1 | 7/2005 | Muramatsu et al. |

FOREIGN PATENT DOCUMENTS

| | | |
|---|---|---|
| JP | 59-100471 | 6/1984 |
| JP | 02-093568 | 4/1990 |
| JP | 04-080777 | 3/1992 |
| JP | 04-344674 | 12/1992 |
| JP | 05-307327 | 11/1993 |
| JP | 06-348134 | 12/1994 |
| JP | 08-036297 | 2/1996 |
| JP | 08-211723 | 8/1996 |
| JP | 09-251235 | 9/1997 |
| JP | 09-269644 | 10/1997 |
| JP | 09-297462 | 11/1997 |
| JP | 11-212346 | 8/1999 |
| JP | 2000-075629 | 3/2000 |
| JP | 2000-081787 | 3/2000 |
| JP | 2000-105498 | 4/2000 |
| JP | 2000-181161 | 6/2000 |
| JP | 2001-183893 | 7/2001 |
| JP | 2001-265101 | 9/2001 |
| JP | 2004-184698 | 7/2004 |

OTHER PUBLICATIONS

U.S. Appl. No. 10/830,223, filed Apr. 23, 2004, Yanagisawa et al.
U.S. Appl. No. 11/045,293, filed Jan. 31, 2005, Muramatsu et al.
U.S. Appl. No. 11/516,659, filed Sep. 7, 2006, Iwata et al.
U.S. Appl. No. 11/748,090, filed May 14, 2007, Takeuchi et al.
U.S. Appl. No. 11/761,731, filed Jun. 12, 2007, Tanaka et al.
U.S. Appl. No. 11/751,163, filed May 21, 2007, Katoh et al.

* cited by examiner

METHOD AND APPARATUS FOR IMAGE FORMING EFFECTIVELY DETECTING DETERIORATION OF DEVELOPER

CROSS-REFERENCE TO RELATED APPLICATIONS

The present patent application claims priority under 35 U.S.C. § 119 to Japanese patent applications No. 2004-180565 filed on Jun. 18, 2004, and No. 2005-049206 filed on Feb. 24, 2005 in the Japan Patent Office, the entire contents of each of which are hereby incorporated herein by reference.

BACKGROUND OF THE INVENTION

1. Field of the Invention

The present invention relates to a method and apparatus for image forming, and particularly relates to a method and apparatus for image forming capable of effectively detecting deterioration of developer.

2. Description of the Background Art

An image forming apparatus such as a copier, facsimile machine, printer, etc. generally includes an image bearing member such as a photoconductive element, and a developing device. Some background developing devices develop an electrostatic latent image formed on a surface of the image bearing member with two-component developer including toner and carrier.

When a developing device performs an image forming operation, the toner may constantly be consumed while the carrier may remain in the developing device. Even through fresh toner is supplied accordingly, the fresh toner may not be sufficiently agitated or mixed with the developer previously contained in the developing device. Some amount of the fresh toner cannot contact with magnetic carrier included in the developer in the above-described developing device and cannot substantially be charged or may be charged to an opposite polarity, causing problems such as image nonuniformity including fogging and contamination due to toner scattering.

The developing device may include an agitating member to agitate and mix the developer and the fresh toner, and uniformly distribute the fresh toner. However, repeated abrasion and collision of the toner and carrier in the developing device may cause deterioration of carrier such as contamination of a carrier particle and peeling of a coating layer of the carrier particle. This may gradually decrease a charging ability of the carrier, resulting in a substantial degradation of quality in an image.

The developer contained in a developer container of the developing device may be replaced on some regular basis before the problem related to image quality based on deterioration of carrier arises, but large labor and cost may be needed for such a replacement of the developer.

A trickle developing system may be employed to the developing device to supply developer including carrier and toner mixed therein or carrier and toner separately to a developer container of the developing device. The trickle developing system may supply fresh carrier as well as fresh toner, and discharge excess developer having degraded charging ability, or deteriorated developer, from the developer container to a collected developer container so that the deteriorated developer can be replaced and the degradation of the charging ability can be prevented.

The developing device with the trickle developing system supplies the amount of carrier in a constant ratio to the amount of consumed toner. However, a characteristic of carrier may significantly change depending on conditions for use of the image forming apparatus, generating a degradation of quality in an image when an amount of fresh carrier supplied to the developing device is too small to replace the deteriorated carrier, and resulting in a waste of carrier when an amount of fresh carrier supplied to the developing device is too large.

To prevent the degradation of charging ability, a small amount of fresh carrier may be supplied to the developing device in accordance with the frequency of the developing operations while the compensation of toner consumed in the developing operation is performed. This technique is proposed based on an idea that deterioration of carrier may be proportional to a period of time the developer container is operated or may be inversely proportional to an amount of toner consumed in the developing operation. The developing device may also detect the deterioration of carrier electrically.

It is not easy to directly detect the deterioration of carrier since a speed of deterioration of carrier depends on a temperature, humidity, a number of outputs, frequency of operations, etc. of the developer container. Because of frequent collision and abrasion with the fresh toner and the carrier previously contained in the developing device, some carriers allow the toner to adhere to the carriers when a larger amount of toner is consumed.

A toner density sensor is used to detect the deterioration of developer at a predetermined period of time after a beginning of using the developer, but is not provided with a specific standard to determine the deterioration of developer. Further, the decrease of a toner density or the number of printouts cannot determine the deterioration of developer. The determination of the deterioration of developer based on the number of printouts may ignore variations of the deterioration of carrier caused by differences of an image area ratio or an image pattern.

It is desirable that the developer may be supplied not based on a period of use time of the developer but based on a result obtained by the detection of the deterioration of carrier. However, no concrete mechanism of directly detecting the deterioration of carrier with high accuracy has been proposed. From a view point of cost reduction, previously proposed mechanisms may be more useful to detect the deterioration than inventing a brand new one.

The developer can automatically be replaced when a condition of the developer reaches a predetermined value, when the toner adheres to a conductive roller contacting the developer, or when the condition of the developer exceeds a predetermined electric value. However, the above-described changes in characteristic values cannot show whether toner or carrier causes the deterioration of developer. Since a replacement of developer may be performed by discharging the deteriorated carrier and supplying fresh carrier, a deterioration level of the carrier needs to be detected based on the entire characteristics of the developer.

A plurality of sensors including an optical sensor can be used to measure respective characteristics of the developer, such as magnetic permeability, toner density, an electric value, etc. However, for example, it is not obvious at which part of an apparatus the sensor measuring the electric value can be disposed. As described above, even though a detecting mechanism is provided, such detecting mechanism is not for detecting the deterioration of developer based on the characteristics of the entire developer.

SUMMARY OF THE INVENTION

Accordingly, one object of the present invention is to eliminate the above-described drawbacks.

Another object of the present invention is to provide a novel developing device capable of effectively detecting deterioration of developer.

Another object of the present invention is to provide a novel method of detecting deterioration of developer.

Another object of the present invention is to provide a novel image forming apparatus including a novel developing device capable of effectively detecting deterioration of developer.

In one embodiment, a novel developing device includes a developer container configured to contain a developer including a toner and a carrier, a developer delivering mechanism configured to deliver the developer toward an image bearing member of an image forming apparatus, and a detecting mechanism configured to detect deterioration of the developer based on a predetermined characteristic of the developer.

The detecting mechanism may include a toner density sensor that has a detecting portion and is configured to obtain a toner density of the toner by magnetic permeability. The toner density sensor may detect the deterioration of the developer based on an output waveform of the toner density obtained by the toner density sensor.

The novel developing device may further include a removing member configured to remove the developer adhered on the detecting portion of the toner density sensor.

The developer delivering mechanism may include a conveying screw configured to convey the developer. The removing member may be integrally mounted on the conveying screw.

The developer delivering mechanism may include a developer carrying member configured to carry the toner contained in the developer to the image bearing member, and the detecting mechanism may include a developer amount sensor configured to obtain an amount of the developer carried on a surface of the developer carrying member. The developer amount sensor may detect the deterioration of the developer based on the amount of the developer.

The novel developing device may further include a regulating member configured to regulate an amount of the developer carried by the developer carrying member. The developer amount sensor may be disposed downstream of the regulating member in a direction to which the developer is delivered by the developer carrying member.

The detecting mechanism may include a developer deterioration sensor configured to obtain a degree of deterioration of the developer, and a toner deterioration sensor configured to obtain a degree of deterioration of the toner included in the developer. The deterioration of the developer may be detected based on the degree of the deterioration of the developer and the degree of deterioration of the toner.

The novel developing device may further include a supplying mechanism configured to supply fresh developer including one of fresh carrier and a mixture of fresh toner and the fresh carrier to the developer container when the deterioration of the developer is detected, and a collecting mechanism configured to collect excess developer.

A user may be allowed to control a supplying operation performed by the supplying mechanism.

Further, in one embodiment, a novel method of detecting deterioration of developer includes filling a developer including a toner and a carrier in a developing device, delivering the developer toward an image bearing member disposed in a vicinity of the developing device, and detecting deterioration of the developer based on a predetermined characteristic of the developer.

Further, in one embodiment, a novel image forming apparatus includes an image bearing member and a developing device. The image bearing member is configured to bear an electrostatic latent image formed on a surface thereof. The developing device is configured to develop the electrostatic latent image into a toner image with toner, and includes a developer container configured to contain a developer including a toner and a carrier, a developer delivering mechanism configured to deliver the developer toward the image bearing member, and a detecting mechanism configured to detect deterioration of the developer based on a predetermined characteristic of the developer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
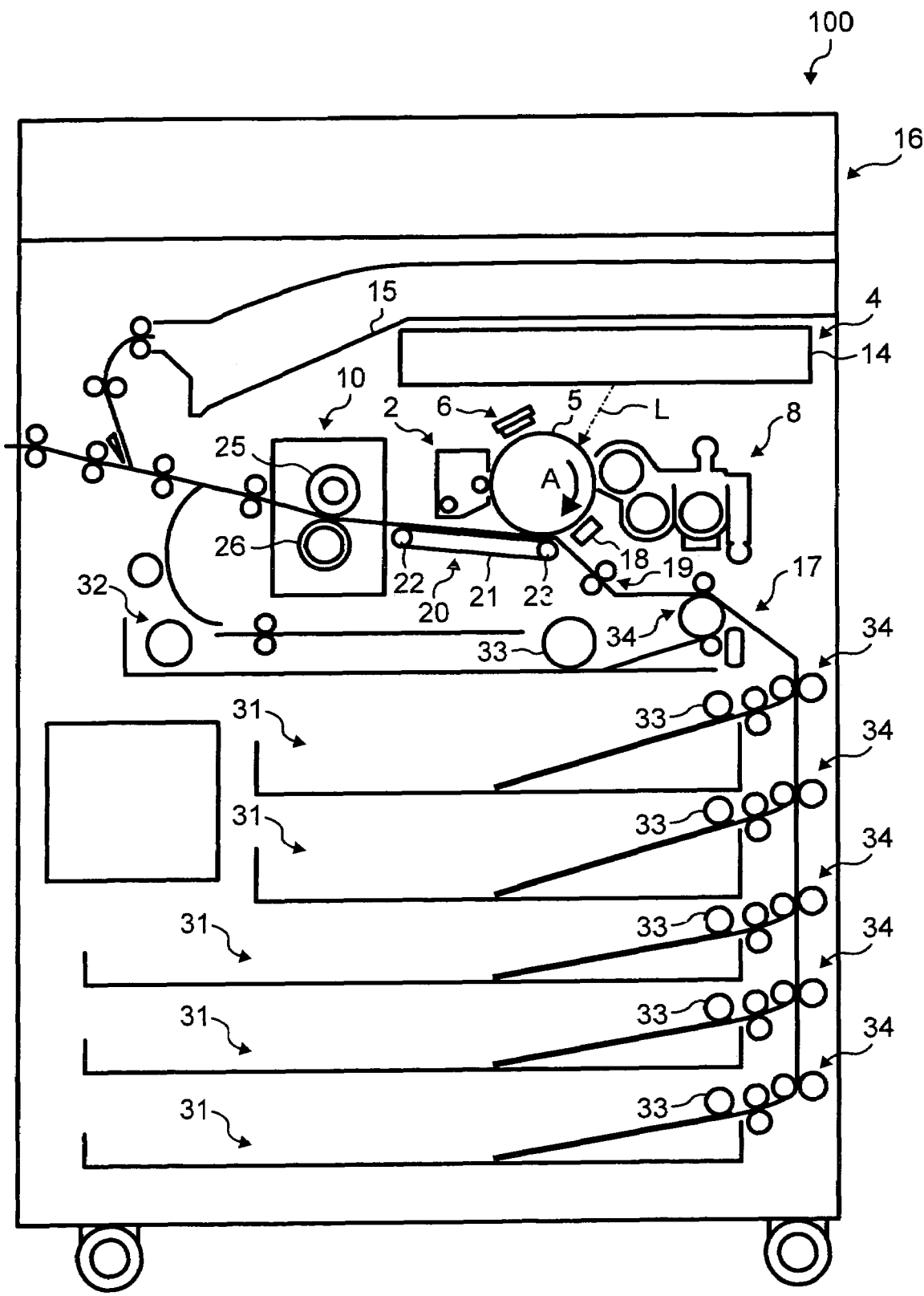
FIG. 1 is a schematic structure of an image forming apparatus according to an exemplary embodiment of the present invention.

In describing embodiments of the present invention illustrated in the drawings, specific terminology is employed for clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Referring to FIG. 1, a schematic structure of an image forming apparatus 100 in one exemplary embodiment of the present invention is described.

The image forming apparatus 100 may be a multi-functional machine including a plurality of functions of a copier, printer, and facsimile machine, but the present invention is not limited only to such an image forming apparatus. For example, an image forming apparatus of the present invention can be a facsimile machine, a printer, a copier, or a multi-functional machine having multiple functions such as of a copier and a printer.

Further, the image forming apparatus 100 has been assumed to perform image forming operations based on image signals corresponding to image data received from an external device. In performing the image forming operations, the image forming apparatus 100 may print an image on a recording medium, for example, a plain paper, a sheet in use for an overhead projector (or an OHP sheet), a heavy paper such as a post card, an envelope, etc.

The image forming apparatus 100 of FIG. 1 produces a black and white image, but the present invention is not limited only to such an image forming apparatus. For example, an image forming apparatus may produce an image having a plurality of colors such as a two-color image and a full-color image.

The image forming apparatus 100 includes an image forming mechanism 4, a sheet discharging tray 15, an image reading mechanism 16, a sheet feeding mechanism 17, a control unit (not shown), a display unit (not shown), and an operation panel (not shown).

The image forming mechanism 4 includes a plurality of image forming units for performing the image forming operations.

The sheet discharging tray 15 is arranged substantially in a middle of a main body of the image forming apparatus 100 between the image reading unit 16 and the image forming mechanism 4 to have a space for stacking the recording medium.

The image reading mechanism 16 such as a scanner is disposed at a position above the sheet discharging tray 15.

The sheet feeding mechanism 17 is disposed at a position below the image forming mechanism 4.

The control unit (not shown) includes a central processing unit (or a CPU), a memory, etc., for controlling entire operations of the image forming apparatus 100.

The display unit (not shown) displays specified information to a user.

The operation panel includes an input unit (not shown) for allowing the user to input specified information.

The image forming mechanism 4 includes a photoconductive element 5, an optical writing device 14, a charging device 6, a developing device 8, an image density sensor 18, a transfer unit 20, a cleaning device 2, a discharging device (not shown), a pair of registration rollers 19, and a fixing device 10.

The photoconductive element 5 is a drum-shape image bearing member disposed at the center of the image forming mechanism 4 so that an electrostatic latent image can be formed on a surface thereof.

The optical writing device 14 is disposed at a position above the photoconductive element 5. The optical writing device 14 reads image data scanned by the image reading mechanism 16 or image data output from an external computer (not shown), and controls light beams L to form an electrostatic latent images on the surface of the photoconductive element 5.

The charging device 6, the developing device 8, and the image density sensor 18 are disposed around the photoconductive element 5 in order along rotation direction A in FIG. 1.

The charging device 6 serving as a charging mechanism uniformly charges the surface of the photoconductive element 5 before the optical writing device 14 irradiates the surface of the photoconductive element 5 to form the electrostatic latent image.

The developing device 8 develops the electrostatic latent image formed on the photoconductive element 5 into a toner image. Details of the developing device 8 will be described later.

The image density sensor 18 is a reflection density sensor and is disposed downstream of the developing device 8. The image density sensor 18 serves as a toner density sensor to obtain a density of toner on an image formed on the photoconductive element 5.

The image density sensor 18 includes a light emitting element and a light receiving element (both not shown in FIG. 1). The light emitting element emits a light beam toward the toner image, and the light receiving element receives the light beam reflected by the toner image to detect a reflection density. The reflection density indicates a degree of ill-charged toner adhered to a non-image forming area or non-image forming areas on the surface of the photoconductive element 5, i.e., a degree of a background contamination. The image density sensor 18 may also detect an amount of toner on a reference toner image formed on the photoconductive element 5, i.e., an image density.

The transfer unit 20 is disposed downstream of the toner density sensor 18 along the rotation direction A of FIG. 1. The transfer unit 20 transfers the toner image formed on the surface of the photoconductive element 5 onto a sheet-type recording medium (not shown), and conveys the recording medium having the toner image thereon.

More specifically, the transfer unit 20 is a belt-type transfer mechanism and includes a belt 21, a driving roller 22, a driven roller 23, and a contact and separation mechanism (not shown).

The belt 21 includes a rubber material having moderate resistance. The belt 21 is passed over or surrounds the driving roller 22 that drives to rotate the belt 21, and the driven roller 23.

The contact and separation mechanism allows the belt 21 to contact to and separate from the surface of the photoconductive element 5 along with the image forming operations performed by the image forming apparatus 100.

The cleaning device 2 serving as an cleaning mechanism removes residual toner on the surface of the photoconductive element 5 after the toner image is transferred onto the recording medium.

The discharging device (not shown) serving as an electronic discharging mechanism discharges the photoconductive element 5 to remove residual electric charge from the surface of the photoconductive element 5 after the residual toner is removed from the surface of the photoconductive element 5.

The pair of registration rollers 19 controls intervals for a black and white image to be properly transferred onto the recoding medium. The recording medium fed from the sheet feeding mechanism 17 is conveyed to a portion between the photoconductive element 5 and the transfer unit 20 in synchronization with the pair of registration rollers 19.

The fixing device 10 serving as a fixing mechanism fixes the toner image transferred from the photoconductive element 5 by the transfer unit 20. The fixing device 10 includes a heat roller 25 and a pressure roller 26. The heat roller 25 applies heat to the toner image formed on the recording sheet to melt the toner on the toner image, and the pressure roller 26 applies pressure to the toner image to fix the toner image to the recording sheet.

The sheet feeding mechanism 17 includes sheet feeding trays 31, a duplex tray 32, sheet feeding rollers 33, and sheet conveying rollers 34.

The sheet feeding trays 31 are respectively disposed at a plurality of vertically different steps and can accommodate different sizes of sheets.

The duplex tray 32 is disposed at a position above the uppermost sheet feeding tray 31. The duplex tray 32 receives the recording sheet, on one side of which a toner image is formed. The recording sheet is fed to the duplex unit 32 after the recording sheet is switched back. The duplex sheet 32 then transports the recording sheet to the image forming mechanism 4 to have another image formed on the other side of the recording sheet.

The sheet feeding rollers 33 feed the recording sheet accommodated in the sheet feeding trays 31 and the duplex tray 32 toward the image forming mechanism 4.

The sheet conveying rollers 34 receive the recording sheet from the respective sheet feeding rollers 33, and further convey the recording sheet toward the image forming mechanism 4.

The above-described image forming apparatus 100 obtains image data e.g. by receiving such image data from the external computer. When the image forming apparatus 100 receives the image data, the photoconductive element 5 rotates in the rotation direction A as shown in FIG. 1 and is uniformly charged with the charging device 6. The optical writing device 14 emits the light beam L passing between the charging device 6 and the developing device 8 toward the photoconductive element 5, as shown in FIG. 1, and irradiates the photoconductive element 5 with the light beam L corresponding to the image data, so that an electrostatic latent image corresponding to the image data may be formed on the surface of the photoconductive element 5. The electrostatic latent image formed on the photoconductive element 5 is developed to a toner image with the developer including toner at the developing device 8. That is, the photoconductive element 5 is charged by the charging device 6, is irradiated by the light beam L emitted by the optical writing unit 14 to form an electrostatic latent image, and is developed by the developing device 8.

The toner image formed on the photoconductive element 5 is then transferred onto the recording sheet fed by the sheet feeding mechanism 17.

The recording sheet is fed from one of the sheet feeding trays 31 of the sheet feeding mechanism 17. When the sheet feeding roller 33 corresponding to the one of the sheet feeding trays 31 is rotated by a drive motor (not shown), the recording sheet placed on the top of a stack of transfer sheets in the one of the sheet feeding trays 31 is fed and conveyed toward a portion between rollers of the pair of registration rollers 19. The recording sheet is fed to the image forming mechanism 4 in synchronization with the pair of registration rollers 19 so that the toner image formed on the surface of the photoconductive element 5 is transferred onto a proper position of the recording sheet. Accordingly, the recording sheet is fed and the toner image is transferred from the photoconductive element 5 onto the recording sheet.

The toner image on the recording sheet is fixed by the fixing device 10 through the application of heat and pressure. The recording sheet having the fixed image is then discharged to the sheet discharging tray 15.

After the toner image is transferred to the recording sheet, the residual toner on the surface of the photoconductive element 5 is removed by the cleaning device 2 and the residual electricity on the surface of the photoconductive element 5 is discharged by the discharging device.

Referring now to FIGS. 2 to 5, details of the developing device 8 are described.

Figure 2:
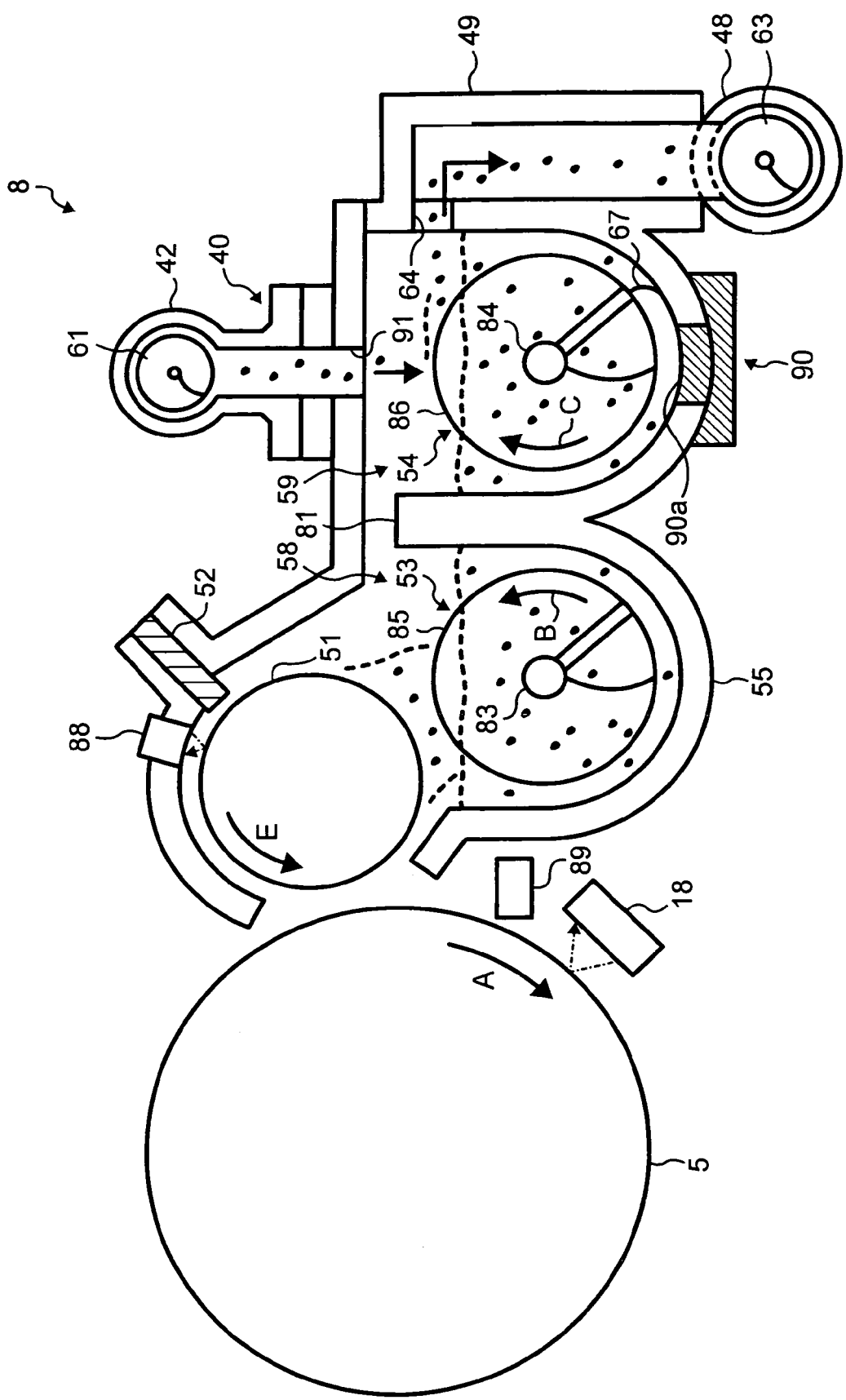
FIG. 2 is a schematic structure of a developing device included in the image forming apparatus of FIG. 1.

As shown in FIG. 2, the developing device 8 includes a developer container 55, a developing roller 51, a developing blade 52, first and second conveying screws 53 and 54, and a toner density sensor 90 including a detecting portion 90a.

The developer container 55 is a casing having an opening facing the photoconductive element 5 and accommodates the developer therein. The developer container 55 further includes a developing chamber 58, an agitating chamber 59, and a partition 81, which is a partial partition, which will be described later. The developer container 55 further includes an inlet 91 and an outlet 64 for replacing the developer, which will be described later.

The developing roller 51 serving as a developer carrying member is disposed at a position closely facing the photoconductive element 5 and rotates in a direction indicated by arrow E in FIG. 2.

The developing roller 51 includes a developing sleeve (not shown) and a magnet roller (not shown).

The developing sleeve includes a non-magnetic material having a cylindrical shape and is driven to rotate in the direction E. The developing sleeve included in the developing roller 51 includes an aluminum material, but the present invention is not limited to such a developing sleeve. For example, the embodiment of the present invention may have a non-magnetic material such as brass, stainless, electrically conductive materials, etc.

The magnet roller includes a plurality of magnets and is fixedly disposed at an inside of the developing sleeve.

The developing blade 52 serving as a developer regulating member regulates a height of a layer of the developer conveyed onto the surface of the developing roller 51.

The developing blade 52 may be an aluminum extrusion, stainless steel, etc., and be fixedly disposed facing a surface of the developing sleeve with a gap of several hundred microns from the surface of the developing sleeve.

Due to magnetic force generated by the magnet roller in the developing roller 51, the developer is magnetically attracted to the surface of the developing sleeve to form a magnetic brush. The developer is then conveyed on the surface of the developing sleeve along with the rotation of the developing sleeve. After the developing blade 52 uniformly regulates the height of the developer, the developer is conveyed to the surface of the photoconductive element 5.

As previously described, the developer contains toner and carrier. Even though the developer is conveyed to the surface of the photoconductive element 5, the toner in the developer electrostatically adheres to the electrostatic latent image formed on the photoconductive element 5 so that the electrostatic latent image is visualized as a toner image. Unused toner and the carrier conveyed with the toner are conveyed back to the developing device 8 along with the rotation of the developing sleeve.

Figure 4:
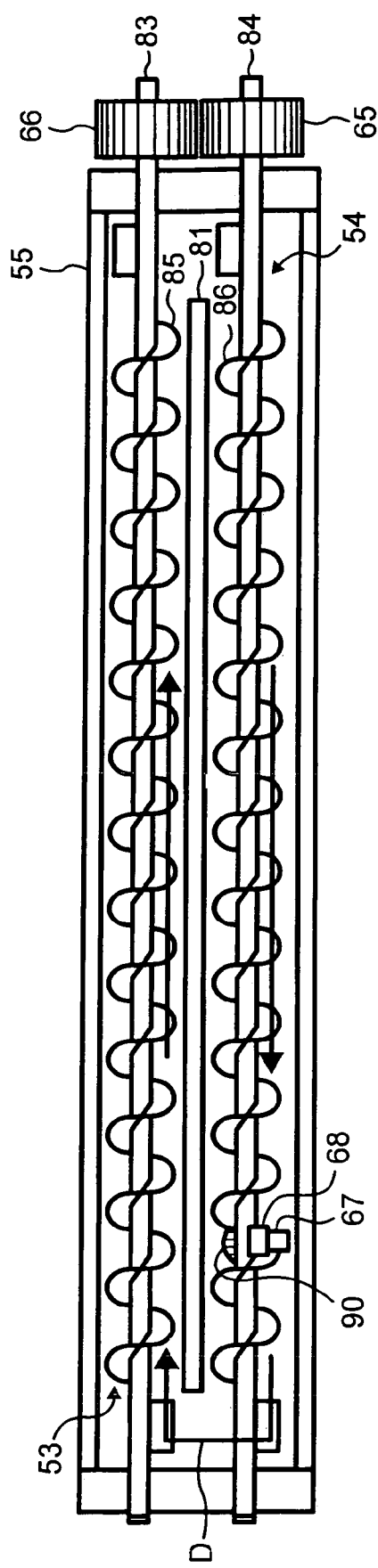
FIG. 4 is a horizontal cross sectional view of a developer container of the developer device, viewed from a top of the developer container.

The first and second conveying screws 53 and 54 are disposed in parallel to each other to circulate and agitate the developer, as shown in FIG. 4, and are disposed in parallel with respect to the developing roller 51.

The first conveying screw 53 is a conveying auger serving as a first conveying member. The first conveying screw 53 includes a shaft 83 and a screw 85. The shaft 83 serves as a core of the rotation of the first conveying screw 53, rotating in a direction indicated by arrow B of FIG. 2. The screw 85 is formed on the shaft 83 as a spirally protruded fin.

The second conveying screw 54 is a delivering member as well as a conveying auger serving as a second conveying member. The second conveying screw 54 includes a shaft 84 and a screw 86. The shaft 84 serves as a core of the rotation of the second conveying screw 54, rotating in a direction indicated by arrow C of FIG. 2, which is an opposite direction as the rotation of the first conveying screw 53. The screw 86 is formed on the shaft 84 as a spirally protruded fin.

Figure 5:
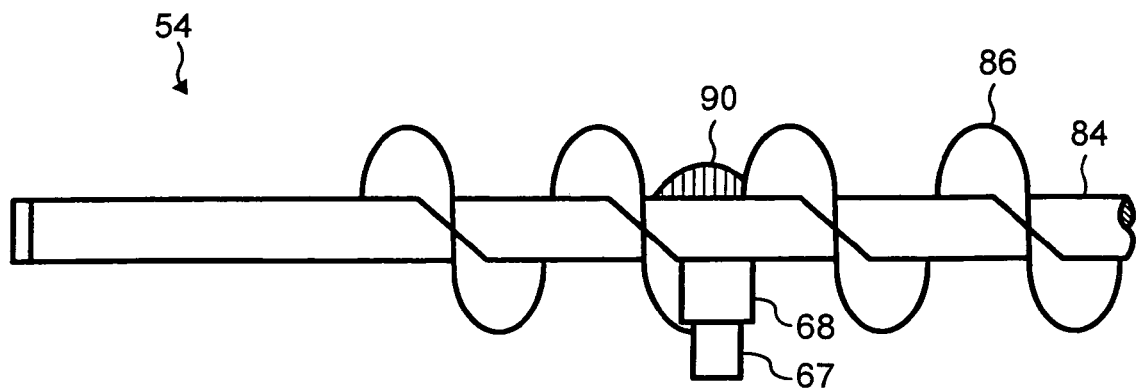
FIG. 5 shows a structure of a second conveying screw included in the developing device of FIG. 2.

Further, as shown in FIGS. 4 and 5, a removing member 67 removing the developer on the detecting portion 90a of the toner density sensor 90 is adhered or glued to a mounting unit 68 to be integrally mounted on the second conveying screw 54.

With the rotations of the shafts 83 and 84, the screw 85 of the first conveying screw 53 and the screw 86 of the second conveying screw 54 convey the developer toward the developing roller 51, which is a direction perpendicular to respective lengths of the shafts 83 and 84.

The first and second conveying screws 53 and 54 rotate in directions opposite to each other to as to convey the developer in directions opposite to each other. More specifically, the first conveying screw 53 rotates in the direction B in FIG. 2 to convey the developer in a direction from an outward end that is a front side to an inward end that is the opposite side in FIG. 2, and conveys the developer from left to right in FIG. 4. The second conveying screw 54 rotates in the direction C in FIG. 2 to convey the developer in a direction from an inward end that is an opposite side to an outward end that is a front side in FIG. 2, and conveys the developer from right to left in FIG. 4. Further, since the partition 81 gives space at both ends with respect to inner walls of the developer container 55, the developer can travel between the two chambers in a predetermined direction. Accordingly, in the process in which the developer is conveyed in a constant direction indicated by arrow D in FIG. 4, the developer can be fully agitated.

As previously described, the developer container 55 includes the developing chamber 58, the agitating chamber 59, and the partition 81 as shown in FIG. 2.

The developing chamber 58 includes the first conveying screw 53 and accommodates developer.

The agitating chamber 59 includes the second conveying screw 54 and accommodates developer.

The partition 81 serving as a separation plate separates the developer container 55 into the developing chamber 58 and the agitating chamber 59. Even through the partition 81 separates the developer container 55 into two spaces, both ends of the partition 81 in its longitudinal direction do not contact with the developer container 55 having respective inner walls standing perpendicular to the ends of the partition 81, as shown in FIG. 4. That is, the partition 81 can give spaces for the developer to travel between the developing chamber 58 and the agitating chamber 59 in a predetermined direction.

The first conveying screw 53 is disposed facing the developing roller 51 to convey developer to the developing roller 51. Therefore, the developing chamber 58 is disposed in a closer position to the developing roller 51 than the agitating chamber 59.

The toner density sensor 90 serves as a toner density detecting mechanism and detects a density of toner contained in the developer of the developer container. The toner density sensor 90 is disposed at the bottom of the agitating chamber 59 so that the detecting portion 90a of the toner density sensor 90 can monitor the inside of the agitating chamber 59.

The developing device 8 further includes a developer amount sensor 88 and a toner scattering sensor 89.

The developer amount sensor 88 serves as a detecting mechanism to obtain an amount of developer carried by the developing roller 51.

The toner scattering sensor 89 serves as a detecting mechanism to obtain a degree of deterioration of developer in accordance with an amount of toner scattered out of the developer container 55 of the developing device 8.

The developing device 8 of FIG. 2 further includes a connecting unit 40, a collected developer container 47 (see FIG. 3), a developer transportation path 48, a developer conveying screw 63, a developer transportation motor (not shown), and a developer discharging device 49.

The connecting unit 40 connects the developing device with a supplying mechanism that will be described later.

The collected developer container 47 collects and contains excess developer discharged from the developer container 55.

The developer transportation path 48 guides the developer discharged from the developer container 55 to the collected developer container 47.

The developer conveying screw 63 is rotated by the developer transportation motor to convey the developer to the collected developer container 47. The developer conveying screw 63 and the developer transportation motor may be omitted unless necessary.

The developer discharging device 49 is disposed to connect the developer container 55 and the developer transportation path 48.

As previously described, the developer container 55 includes the inlet 91 and the outlet 64.

The inlet 91 is arranged to connect with the connecting unit 40 and serves as an opening to receive, through the connecting unit 40, toner and carrier conveyed from the supplying mechanism.

The outlet 64 is arranged to connect with the developer discharging device 49 and serves as an opening to discharge excess developer due to an increase of an entire amount of the developer after the carrier or developer is supplied from the supplying mechanism. The excess developer can be discharged out of the developer container 55 through the developer discharging device 49 and the developer transportation path 48 to the collected developer container 47.

Figure 3:
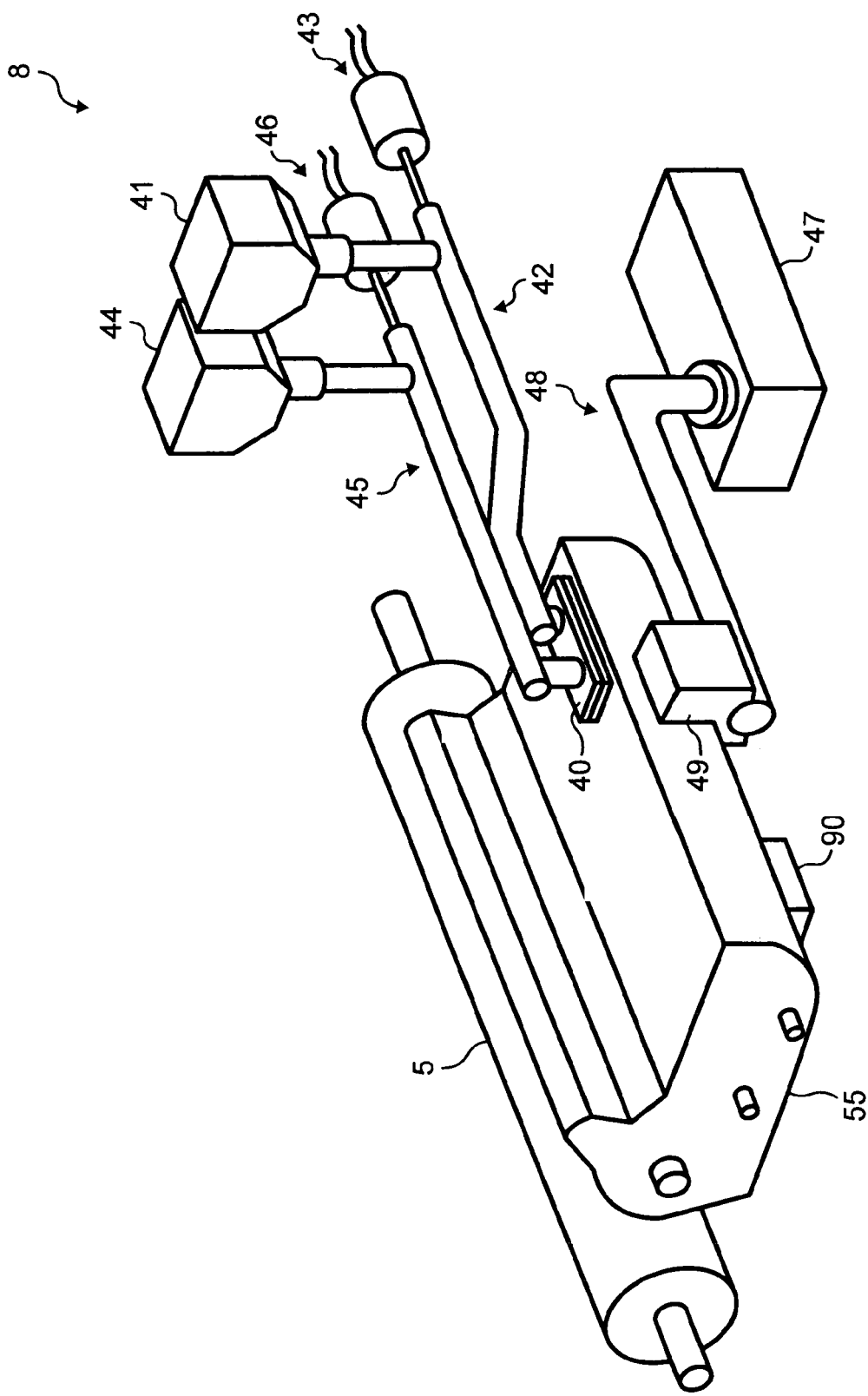
FIG. 3 is a perspective view of the developing device of FIG. 2.

In FIG. 3, the developing device 8 further includes a toner cartridge 41, a toner transportation path 42 (also see FIG. 2), a toner conveying screw 61 (see FIG. 2), and a toner transportation motor 43.

The toner cartridge 41 accommodates supplemental fresh toner therein to supply the fresh toner to the developer container 55. The fresh toner has the same structure and function as the toner previously contained in the developer container 55.

The toner transportation path 42 is connected with the connecting unit 40 and guides the fresh toner accommodated in the toner cartridge 41 to the developer container 55.

The toner conveying screw 61 is disposed in the toner transportation path 42 and is rotated by the toner transportation motor 43 to convey the fresh toner toward the developer container 55.

The developing device 8 further includes a carrier cartridge 44, a carrier transportation path 45, a carrier conveying screw (not shown), and a carrier transportation motor 46.

The carrier cartridge 44 accommodates supplemental fresh carrier to supply the fresh carrier to the developer container 55. The fresh carrier has the same structure and function as the carrier previously contained in the developer container 55.

The carrier transportation path 45 is connected with the connecting unit 40 and guides the fresh carrier accommodated in the carrier cartridge 44 to the developer container 55. The carrier transportation path 45 is shown as the same as the toner transportation path 42 in FIG. 2.

The carrier conveying screw is disposed in the carrier transportation path 45 and is rotated by the carrier transportation motor 46 to convey the fresh carrier toward the developer container 55. The carrier conveying screw is shown as the same as the toner conveying screw 61 in FIG. 2.

The carrier cartridge 44 generally accommodates the supplemental fresh carrier solely. However, if necessary, the carrier cartridge 44 may accommodate a small amount of the fresh toner mixed with the fresh carrier. In this case, the carrier cartridge 44 contains supplemental fresh developer.

The fresh toner contained in the toner cartridge 41 is supplied via the toner transportation path 42 to the developer container 55 by a small amount at a time. The fresh carrier or fresh developer contained in the carrier cartridge 44 is supplied via the carrier transportation path 45 to the developer container 55 by a small amount at a time.

According to the above-described operations, the carrier cartridge 44, the carrier transportation path 45, the carrier conveying screw, the carrier transportation motor 46, and the connecting unit 40 may form the supplying mechanism supplying the fresh carrier or the fresh developer.

The toner transportation motor 43 controls the number of rotations of the toner conveying screw 61 to adjust a supplying amount of the fresh toner. The carrier transportation motor 46 controls the number of rotations of the carrier conveying screw to adjust a supplying amount of the fresh carrier or the fresh developer. The rotations of the toner transportation motor 43 and the carrier transportation motor 46 are controlled by the control unit.

When the fresh carrier or the fresh developer is supplied from the carrier cartridge 44 to the developer container 55, the developer previously accommodated in the developer container 55 may overflow. The overflowed developer may be discharged via the developer discharging device 49 and the developer transportation path 48 into the collected developer container 47.

According to the above-described operations, the collected developer 47, the developer transportation path 48, the developer conveying screw 63, the developer transportation motor, and the developer discharging device 49 may form a collecting mechanism.

The toner cartridge 41, the carrier cartridge 44, and the collected developer container 47 are respectively detachable with respect to the developing device 8. More specifically, the toner cartridge 41 is detachable with respect to the toner transportation path 42 to be easily replaceable when the fresh toner contained therein runs out. The carrier cartridge 44 is detachable with respect to the carrier transportation path 45 to be easily replaceable when the fresh carrier contained therein runs out. The collected developer container 47 is detachable with respect to the developer transportation path 48 to be easily replaceable when the fresh developer contained therein becomes full.

The transportation systems shown in the embodiment use screws, but the present invention is not limited only to such transportation systems. For example, an embodiment of the present invention can be a developing device with a transportation system using a pump mechanism such as a pump conveying powder.

In FIG. 4, gears 65 and 66 are disposed outside the developing device 8 to rotate the first and second conveying screws 53 and 54, respectively. The gears 65 and 66 are driven by respective driving motors (not shown) that are controlled by the control unit to rotate in directions opposite to each other so that the shaft 83 of the first conveying screw 53 and the shaft 84 of the second conveying screw 54 may rotate in directions opposite to each other.

As described above, the developing device 8 having such a structure agitates the developer by the first and second conveying screw 53 and 54 so that the toner contained in the developer is charged. The developer contained in the developing chamber 58 is then delivered to the developing roller 51 and is regulated by the developing blade 52. The developer regulated to a layer having an appropriate amount thereof is conveyed to a developing area between the developing roller 51 and the photoconductive, element 5 along with the rotation of the developing roller 51 in the direction of the arrow E. The fully charged toner contained in the developer is electrostatically delivered to the electrostatic latent image formed on the surface of the photoconductive element 5 so that the electrostatic latent image may be visualized to a toner image.

Thus, the developing device 8 performs a developing operation using two-component developer including non-magnetic black toner and magnetic carrier. As the developing operation is repeatedly performed, the amount of toner contained in the developer gradually reduces. To compensate for the loss of toner in the developer, the fresh toner is supplied accordingly from the toner cartridge 41 to maintain a constant toner density of the developer circulating in the developer container 55. To accordingly supply the fresh toner into the developer container 55, the control unit performs a feedback control using the toner density sensor 90.

The developing device 8 is designed such that the fresh toner supplied through the inlet 91 to the developer container 55 falls onto the second conveying screw 54 in the process of the feedback control. That is, the inlet 91 is arranged at a position to supply the fresh toner to the second conveying screw 54. With the above-described structure, an image can be uniformly developed. When the fresh toner directly falls onto the first conveying screw 53, the fresh toner may not be sufficiently agitated to be mixed with the developer before the fresh toner mixed with the developer is conveyed to the developing roller 51. Accordingly, the inlet 91 arranged at the position to supply the fresh toner to the second conveying screw 54 allows the toner to be sufficiently agitated and uniformly distributed in the developer contained in the first conveying screw 53 before the fresh toner mixed with the developer previously contained in the developer container 55 reaches the developing roller 51. Therefore, the fresh toner supplied to the developer container 55 as described above may not cause a problem such as nonuniformity in the developing operation.

Figure 6:
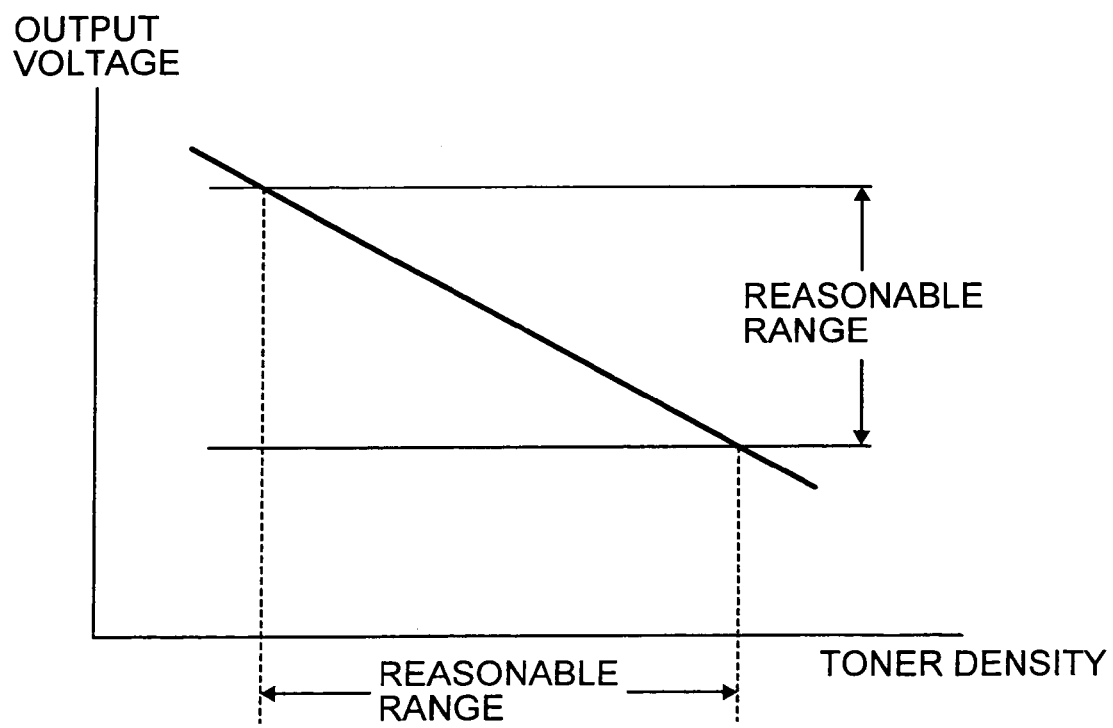
FIG. 6 is a graph showing a relationship of an output voltage and a toner density of developer contained in the developing device.

Referring to FIG. 6, a characteristic of the developer is shown.

A substantially linear shape shown in FIG. 6 represents a characteristic of the developer between a toner density and an output voltage of the toner density sensor 90. That is, when the toner density increases, the magnetic permeability decreases, and the output voltage of the toner density sensor 90 becomes low. Conversely, when the toner density decreases, the magnetic permeability increases, and the output voltage of the toner density sensor 90 becomes high. That is, the toner density can be obtained in accordance with the output voltage of the toner density sensor 90. The output voltages as shown in FIG. 6 are average values of a predetermined period of time.

According to the above-described characteristic, when an output voltage of the toner density sensor 90 increases, it is detected that the toner density decreases, that is, the toner is consumed. In that case, the control unit controls the developing device 8 to supply the fresh toner from the toner cartridge 41 to the developer container 55.

The toner density sensor 90 is arranged to surely detect magnetic permeability of the developer. As shown in FIG. 2, the toner density sensor 90 is disposed at the bottom of the agitating chamber 59 so that the detecting portion 90a of the toner density sensor 90 can monitor the inside of the agitating chamber 59.

Since the magnetic permeability of developer may vary in accordance with a change in environment or in bulk density of developer, a target output voltage of the toner density sensor 90 is accordingly calibrated. More specifically, a target output voltage of the toner density sensor 90 may be measured by the image density sensor 18 and be calibrated in accordance with an output result of image density of a reference toner image formed on the photoconductive element 5.

The fresh toner supplied to the developer container 55 is agitated and mixed by the first and second conveying screws 53 and 54 with the developer previously contained in the developer container 55.

Since the fresh toner is accordingly supplied as described above, the toner density in the developer container 55 can be properly maintained. However, when toner and carrier are repeatedly abraded and collided, a portion of a toner particle adheres to a carrier particle, and a surface of the carrier particle may be contaminated or a coated layer of the carrier particle may be peeled. The carrier including the contaminated or peeled carrier particles may cause deterioration of the carrier, gradually reducing a charging ability of the carrier with respect to the toner, and sharply reducing image quality.

Therefore, the deteriorated carrier may be replaced to maintain the charging ability to the toner when the carrier is determined to be deteriorated. An appropriate amount of carrier is preferably replaced because unsatisfactory amount of carrier may induce a lower charging ability of toner and excess amount of carrier may induce a waste of carrier, which may go against the trend of effective use of resources, etc.

Instead of additionally providing a device for detecting deterioration of developer, the developing device 8 employs a detection method using the toner density sensor 90 to detect deterioration of developer so that the deterioration of developer can be detected based on an output waveform of the toner density sensor 90.

When the carrier deteriorates, a degree of adhesion between the carrier and toner or between the carriers may increase and the fluidity of the developer may become worse. With the characteristic of the carrier, the deterioration of carrier is detected.

To employ the above-described detection method, the developing device 8 utilizes the removing member 67. As previously described, the removing member 67 is integrally mounted on the second conveying screw 54 of the agitating chamber 59 in which the developer to be detected by the toner density sensor 90 is accommodated, and removes the developer adhered on the detecting portion 90a of the toner density sensor 90 as shown in FIGS. 2, 4, and 5.

As shown in FIG. 4, the removing member 67 includes a film-shape resin sheet adhered or glued to the mounting unit 68 integrally mounted to the shaft 84 and the screw 86 of the second conveying screw 54. The removing member 67 may be flexible to contact with the detecting portion 90a to remove the developer adhered on the detecting portion 90a in every cycle of rotation of the second conveying screw 54. The removing member 67 may be attached to the mounting unit 68 with an adhesive tape instead of being adhered or glued thereto.

There are a few millimeters of a clearance between the screw 86 and an inner wall of the agitating chamber 59 to prevent the screw 86 and the agitating chamber 59 from being damaged due to abrasion with the developer during rotations by the screw 86. Therefore, the developer remaining on the detecting portion 90a may not be fully removed.

By providing the removing member 67, the developer adhered on the detecting portion 90a may effectively be removed and the developer in the agitating chamber 59 may effectively be agitated.

As described above, the toner density sensor 90 can detect the density of toner contained in the developer. In particular, since the detecting portion 90a of the toner density sensor 90 is disposed at the bottom of the agitating chamber 59 that is a space in which the removing member 67 interferes with the developer, the toner density sensor 90 can surely and effectively detect the toner density.

Figure 7:
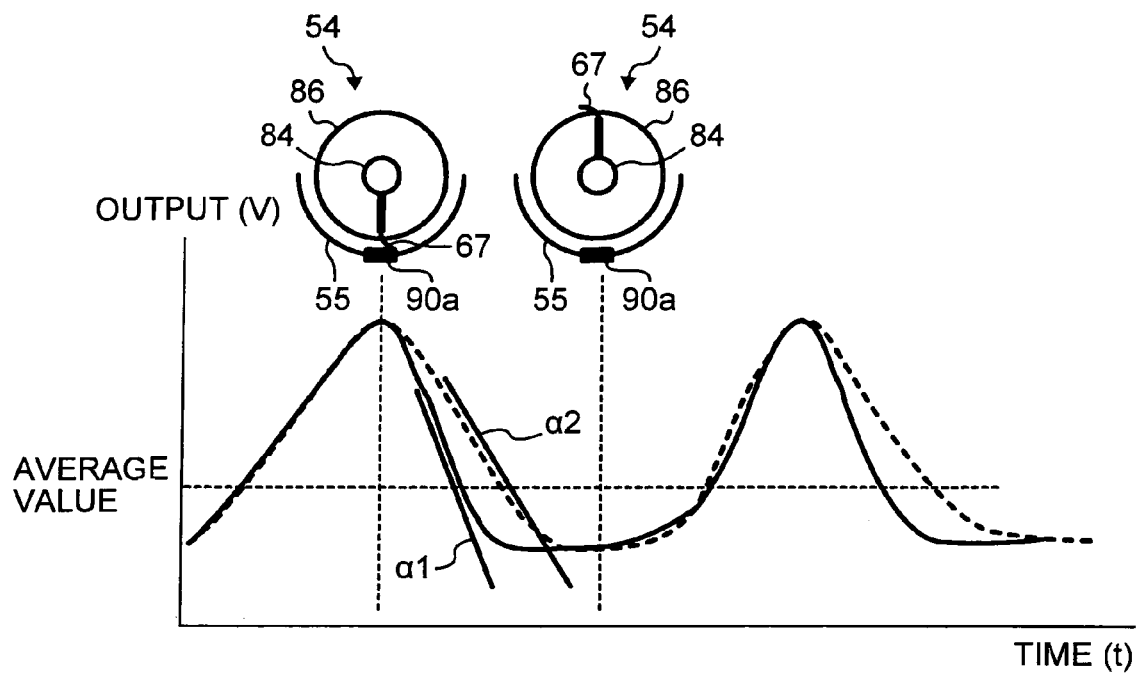
FIG. 7 is a graph showing an example of a detecting method of deterioration of developer.
Figure 8:
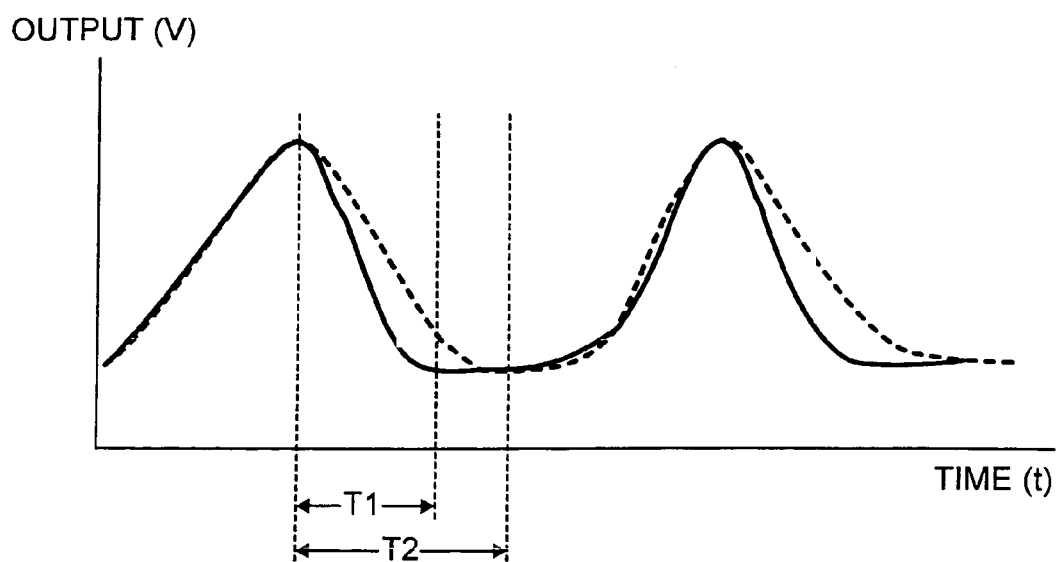
FIG. 8 is a graph showing another example of the detecting method of deterioration of developer.
Figure 9:
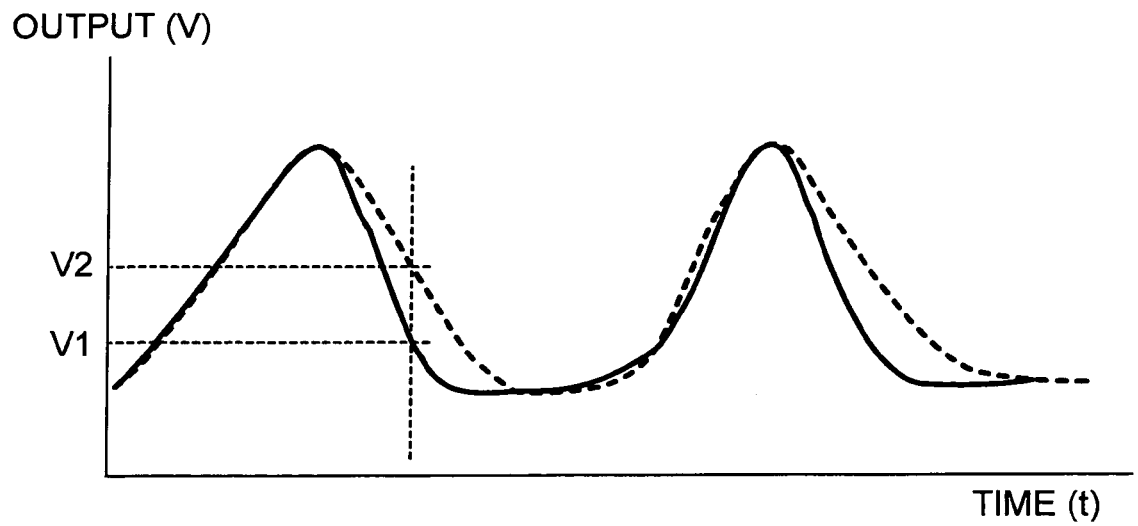
FIG. 9 is a graph showing another example of the detecting method of deterioration of developer.

Referring to FIGS. 7 to 9, a plurality of detection methods using the toner density sensor 90 and the related apparatus, device, and unit are described.

FIG. 7 shows output waveforms of toner densities output by the toner density sensor 90. When the removing member 67 comes over the toner density sensor 90 contacting the detecting portion 90a, an amount of developer adhering on the detecting portion 90*a* sharply reduces, so that an output voltage of the toner density obtained by the toner density sensor 90 may reach its peak value. After the removing member 67 passes the detecting portion 90*a* of the toner density sensor 90, the developer flows over the detecting portion 90*a*, and the amount of developer gradually increases. When the removing member 67 rotates by 180 degrees from the detecting portion 90*a* along the inner wall of the agitating chamber 59, the output voltage may reach its bottom value. That is, an output voltage of the toner density obtained by the toner density sensor 90 may reach its bottom value when a phase of the removing member 67 after rotating 180 degrees is moved from a phase in which the output voltage reaches the peak value.

As described above, when the carrier deteriorates, a degree of adhesion between the toner and carrier or between the carriers increases and fluidity of the developer becomes worse. Therefore, a period of time between the peak value and bottom value of the output voltage may be longer as deterioration of carrier increases. For example, the output waveform in a solid line shown in FIG. 7 represents an output waveform of fresh developer including fresh carrier, and the output waveform in the dotted line represents an output waveform when the deterioration of developer proceeds. That is, a period of time between the peak and bottom values of the output waveform in the dotted line may be longer than that in the solid line.

The detection method of detecting deterioration of developer according to the present invention uses the toner density sensor 90 for detecting toner density so that deterioration of developer or carrier may be detected based on the output waveforms. Therefore, deterioration of carrier can surely be detected without inducing an increase in cost, and an appropriate amount of supplemental carrier can prevent a shortage of charge ability with respect to toner as well as a waste of carrier.

More specifically, the detection method of detecting deterioration of developer according to the present invention uses the toner density sensor 90 to detect a deterioration of developer based on output waveforms as follows.

That is, deterioration of developer may be detected based on an output waveform having a slope of a line between the peak and bottom values obtained by the toner density sensor 90.

As shown in FIG. 7, as the developer deteriorates, a slope from the peak value to the bottom value may change from $\alpha 1$ to $\alpha 2$.

For example, an initial slope is measured based on an output waveform with fresh developer and is stored in a memory of the control unit as a reference slope. When a slope having a smaller angle by a predetermined angle than the reference slope is detected, it is determined that the developer is deteriorated. The above-described detection is performed based on the output waveform having the slope measured from the peak value to the bottom value of the toner density, but an output waveform having a slope measured from the bottom value to the peak value of the toner density may also be used.

It is desirable to measure the slope under a condition with a constant toner density, for example when the initial slope is measured. A decrease in fluidity of developer may occur due to a decrease in fluidity of carrier as well as a decrease in fluidity of toner, thereby a change in toner density may cause the fluidity of developer to change. When the slope of the output waveform is measured under the condition with a constant toner density, the deterioration of toner can be restricted to the minimum. To further restrict the decrease in fluidity of toner and correctly measure deterioration of carrier, it is desirable that the slope of the output waveform is measured under the condition with toner density lower than the constant toner density.

The deterioration of developer can also be detected based on the output waveform having a period of time between the peak value and the bottom value obtained by the toner density sensor 90 along with or instead of the above-described detection of deterioration of developer based on the slope.

As shown in FIG. 8, as the developer deteriorates, a period of time from the peak value to the bottom value may change from T1 to T2.

For example, an initial period of time is measured based on an output waveform with fresh developer and is stored in a memory of the control unit as a reference period of time. When a period of time longer by a predetermined period of time than the reference period of time is detected, it is determined that the developer is deteriorated. The above-described detection is performed based on the output waveform having the period of time from the peak value to the bottom value of the toner density that may also be used.

It is desirable to measure the period of time under a condition with a constant toner density, for example when the initial period of time is measured. A decrease in fluidity of developer may occur due to a decrease in fluidity of carrier as well as a decrease in fluidity of toner, thereby a change in toner density may cause the fluidity of developer to change, which is based on the same reason described in the detection based on the output waveform having the slope. Further, it is also desirable that the period of time of the output waveform is measured under the condition with toner density lower than the constant toner density, which is also based on the same reason described in the detection based on the output waveform having the slope.

The deterioration of developer can also be detected based on the output waveform having an output voltage after a predetermined period of time from a predetermined output value obtained by the toner density sensor 90 along with or instead of the above-described detections of deterioration of developer based on the output waveform having the slope and/or the period of time.

As shown in FIG. 9, as the developer deteriorates, an output voltage obtained after a predetermined period of time may change from V1 to V2. In this case, however, the above-described predetermined period of time is desirably set to be shorter than a period of time at the peak value or the bottom value of the output waveform.

For example, an initial output voltage after the predetermined period of time from the peak value of fresh developer is measured based on an output waveform with fresh developer and is stored in a memory of the control unit as a reference output voltage. When an output voltage having a smaller voltage by a predetermined voltage than the reference output voltage is detected, it is determined that the developer is deteriorated.

The above-described detection is performed based on an output voltage after the predetermined period of time from the peak voltage of an output waveform of a toner density, but an output voltage after the predetermined period of time from the bottom voltage or between the bottom and peak voltages of an output waveform of the toner density may also be used.

It is desirable to measure an output voltage under a condition with a constant toner density, for example when the initial output voltage is measured. A decrease in fluidity of developer may occur due to a decrease in fluidity of carrier as well as a decrease in fluidity of toner, thereby a change in toner density may cause the fluidity of developer to change, which is based on the same reason described in the detection based on the output waveform having the slope. Further, it is also desirable that a period of time of the output waveform is measured under the condition with toner density lower than the constant toner density, which is also based on the same reason described in the detection based on the output waveform of the slope.

In any case of the above-described measurements of a slope, a period of time, and an output value based on an output waveform, each reference value is not limited to a value measured under the condition with fresh developer. The reference value may be a value previously stored in the memory of the control unit before shipping.

As described above, the developing device 8 includes the toner density sensor 90 and a detecting mechanism to detect deterioration of developer with the above-described detection method.

When deterioration of developer is detected, the control unit operates the carrier transportation motor 46 to rotate the carrier conveying screw so that the fresh carrier or the fresh developer may be supplied through the carrier transportation path 45, the connecting unit 40, and the inlet 91 to the developer container 55.

When the above-described supplying operation is performed, an amount of developer in the developer container 55 increases, and a bulk of the developer accumulated in the developer container 55 may become greater and higher than a bottom portion of the outlet 64. Excess developer accumulated higher than the bottom of the outlet 64 overflows, and goes through the developer discharging device 49. The excess developer is then conveyed by the developer conveying screw 63 driven by the developer transportation motor, through the developer transportation path 48, and is collected by the collected developer container 47.

As described above, the developing device 8 is controlled such that a discharging amount of developer is determined based on its level or height of the accumulated developer. When the fresh carrier or the fresh developer is supplied to the developer container 55, the developer contained in the developer container 55 may be discharged by an amount corresponding to the supplied amount of the fresh carrier or the fresh developer so that the carrier previously contained in the developer container 55 can be replaced. The control unit performs a feedback control to continue the supplying operation until the deterioration of developer is no longer detected.

In the process of the feedback control, the fresh carrier or developer supplied through the inlet 91 to the developer container 55 may be agitated and uniformly distributed in the developer previously contained in the developer container 55 from a point of time when the fresh carrier or fresh developer falls onto the second conveying screw 54 to a point of time when the developer mixed with the fresh carrier or fresh developer reaches the developing roller 51 before the developing operation. With the above-described operation, a problem such as nonuniformity may not occur in the developing operation.

Further, the developing device 8 allows a user to control the supplying operation of the fresh carrier or developer.

When deterioration of developer is detected, the control unit included in the image forming apparatus 100 can give instructions to the display unit included in the operation panel to indicate that the deterioration of developer is detected in the image forming apparatus 100 including the developing device 8, and allow the user to control the supplying operation of the fresh carrier or developer through an input unit included in the operation panel.

The control of the supplying operation may allow the user to change a threshold to detect the deterioration of developer according to image quality of an image on the recording sheet. That is, when the user determines the image on the recording sheet has good image quality, the user may operate the input unit to adjust the threshold used to detect the deterioration of developer. When the user determines the image quality is good, the threshold can be set to a lower level to reduce the number of supplying operations. When the user determines the image needs better image quality, the threshold can be set to a higher level to increase the number of the supplying operations. The input unit can have additional keys such as an image quality selection key corresponding to the setting of the threshold so that levels of image quality can be selected.

Further, an embodiment of the present invention can arrange the control performed by the user such that the user can give instructions to continue the image forming operation without supplying the fresh developer when the user determines the image formed on the recording sheet has good image quality.

Setting a lower level of the threshold and/or continuing an image forming operation may limit an amount of fresh developer and can prevent excess consumption of developer. Setting a higher level of the threshold can meet with demands from a user requiring or preferring a higher quality in an image.

With the above-described operations, the display unit may function as a display mechanism displaying the results of the above-described detection and the input unit may function as an arranging mechanism arranging the above-described supplying operations.

As previously described, the supplying mechanism supplying the fresh carrier includes the carrier cartridge 44, the carrier transportation path 45, the carrier conveying screw, the carrier transportation motor 46, and the connecting unit 40. The supplying mechanism may continuously supply the fresh carrier for a predetermined number of times. However, when deterioration of developer is still detected or when a detection result such as a detected value is not in an appropriate range even after the above-described continuous supplying operation, the supplying mechanism can stop the supplying operation and issue a warning through the display unit. The warning may avoid unnecessarily supplying or discharging the developer when the deterioration of developer is detected due to an unexpected factor so that the unit can be stopped, to allow performing an examination of the status and a maintenance of the unit.

The above-described detection method of the deterioration of developer may be performed with the toner density sensor 90 serving as a detection unit so that the deterioration of developer can be detected based on a characteristic of fluidity of the developer agitated and conveyed by the second conveying screw 54.

However, the present invention is not limited to the above-described detection method. An embodiment of the present invention can detect deterioration of the developer with the developer amount sensor 88. The developer amount sensor 88 serving as a detection unit can detect the deterioration of developer based on a characteristic of amount of developer carried by the developing roller 51 as a developer carrying member.

The detection method according to the present invention may also be performed with a torque sensor (not shown in figure), the image density sensor 18, and the toner scattering sensor 89.

The torque sensor serving as a toner detecting mechanism to obtain a degree of the deterioration of toner contained in the developer is a detecting unit to detect deterioration of developer based on a characteristic of fluidity of the developer agitated and conveyed by the first and second conveying screws 53 and 54 included in the developer delivering mechanism.

The image density sensor 18 serving as a background contamination sensor to obtain a degree of contamination of the developer is a detection unit to detect deterioration of developer based on a characteristic of charging ability of the developer carried and conveyed by the photoconductive element 5.

The toner scattering sensor 89 serving as a detection sensor is a detection unit to detect deterioration of developer based on a characteristic of charging ability of the developer carried and conveyed by the photoconductive element 5 and the developing roller 51.

The following show a plurality of detection methods using the developer volume detecting sensor 88, the torque sensor, the image density sensor 18, and/or the toner scattering sensor 89 with the related apparatus, device, and unit. The descriptions will generally be given focusing on the characteristics different from the detection methods using the above-described toner density sensor 90.

The detection method of deterioration of the developer using the developer amount sensor 88 is as follows.

Figure 10:
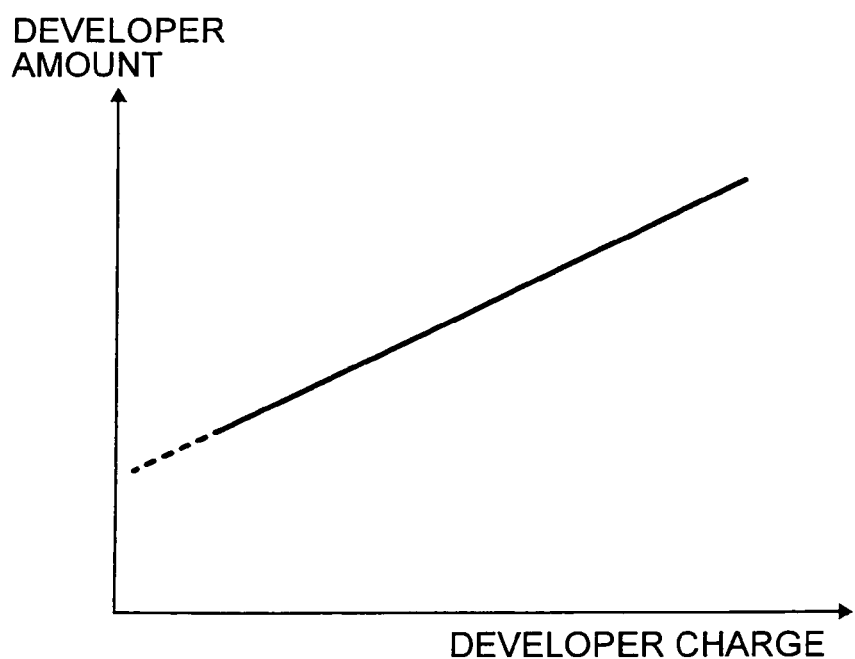
FIG. 10 is a graph showing a correlation between a developer charge and an amount of developer carried by a developer carrying member.

As previously described, the developer is magnetically attracted by magnetic force generated by the magnet roller in the developing roller 51, and is conveyed over the rough surface of the developing sleeve using surface roughness thereof. It has been proved that there is a relationship between an amount of developer charge and an amount of developer conveyed or attracted to the developing roller 51 as shown in FIG. 10 when a degree of the surface roughness of the developing sleeve is constant. More specifically, when the amount of developer charge is large, the amount of developer on the developing roller 51 may be large. Conversely, when the amount of developer charge is small, the amount of developer on the developing roller 51 may be small.

With the relationship between the amount of developer charge and the amount of developer on the developing roller 51, an amount of developer charge can be calculated based on the amount of developer on the developing roller 51 so that a charging failure due to deterioration of developer can be detected. In this embodiment, the above-described relationship is used to obtain the amount of developer on the developing roller 51 so that the deterioration of developer can be determined based on the amount of developer charge obtained by the amount of developer on the developing roller 51.

To obtain the amount of developer on the developing sleeve, an optical sensor can be used to obtain a parameter, for example, a reflection density of the developing sleeve, a resistance between the developing blade 52 and the developing sleeve, the height of a point of a magnetic brush, etc. In this embodiment, the developer amount sensor 88 is used to obtain the reflection density, the resistance, and the height of the magnetic brush. However, the present invention is not limited to obtaining such parameters using the developer amount sensor 88.

Figure 11A:
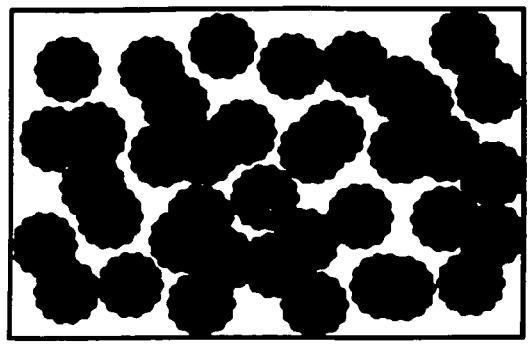
FIG. 11A is a plane view of the developer carried by the developer, carrying member having an amount of developer.
Figure 11B:
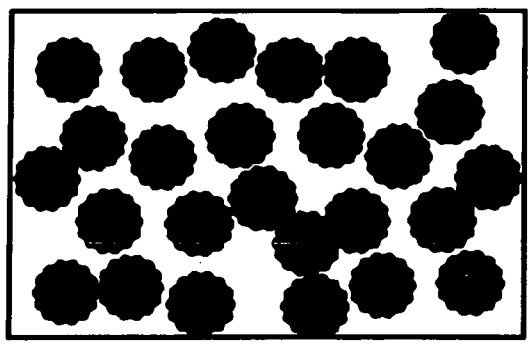
FIG. 11B is a plane view of the developer carried by the developer carrying member having another amount of developer.
Figure 12:
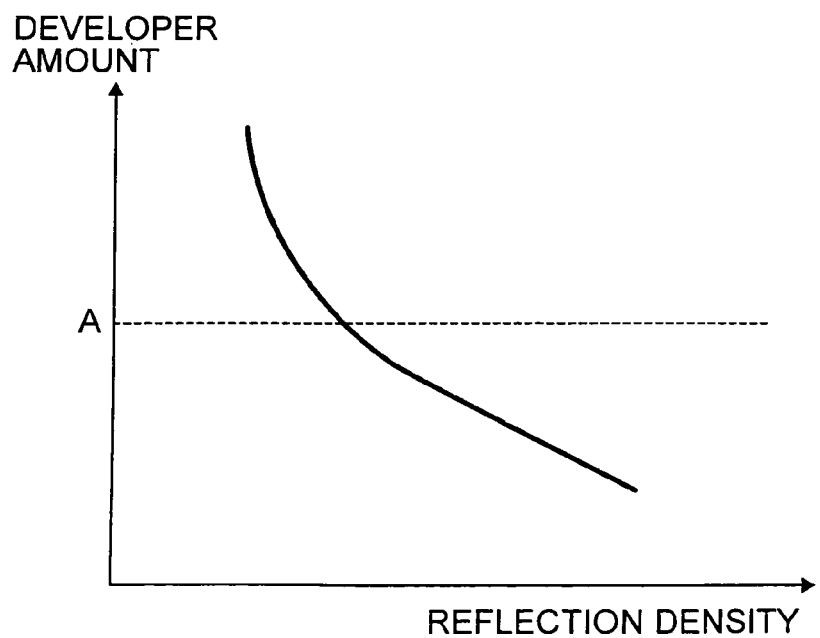
FIG. 12 is a graph showing a correlation between an output voltage of a developer volume sensor and an amount of developer carried by the developer carrying member.

Referring to FIGS. 11A to 12, obtaining the reflection density of the developing sleeve is described.

When the amount of developer on the developing sleeve is large as shown in FIG. 11A, a magnetic brush is thickly formed, and thereby the developer volume sensor 88 may obtain a small amount of the reflection density. Conversely, when the amount of developer on the developing sleeve is small as shown in FIG. 111B, a magnetic brush is thinly formed, and a large amount of area on the surface of the developer sleeve is exposed, and thereby the developer volume sensor 88 may obtain a large amount of the reflection density. Therefore, a relationship between the output results of the developer amount sensor 88 serving as a reflection density sensor and the amount of developer on the developing sleeve may be indicated as shown in FIG. 12.

Next, obtaining the height of a point of the magnetic brush is described.

To obtain the height of the magnetic brush, a surface roughness may be measured without contacting the surface. The developer amount sensor 88 serving as a surface roughness measuring sensor measures a height profile of developer in a constant area on the surface of the developing sleeve to obtain an average value of the heights. The measured average value of the heights indicates an average height of the magnetic brush, so the amount of developer on the developing sleeve may be obtained by multiplying a value of the entire surface of measured areas.

Figure 13A:
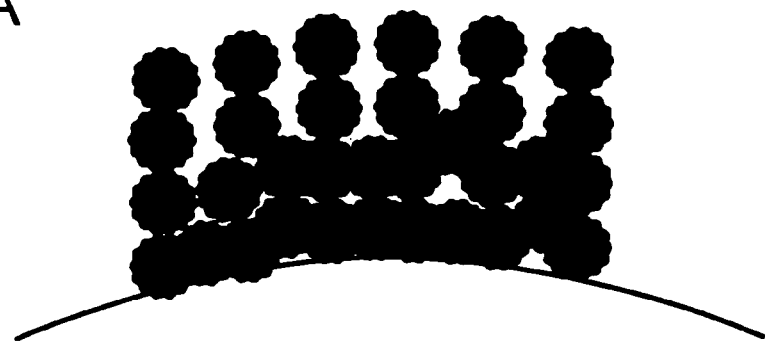
FIG. 13A is a front view of the developer carried by the developer carrying member having an amount of developer.
Figure 13B:
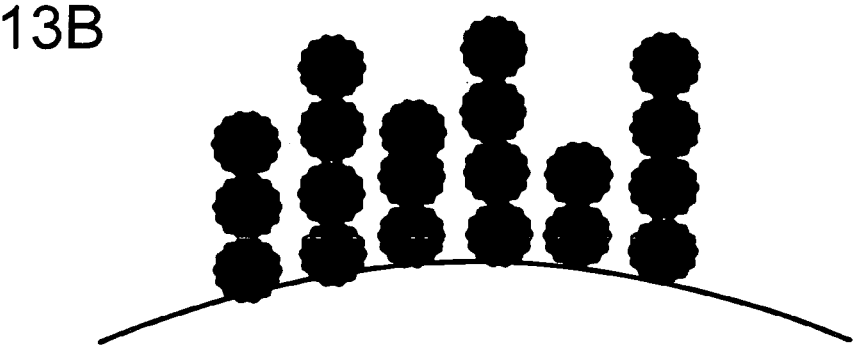
FIG. 13B is a front view of the developer carried by the developer carrying member having another amount of developer.
Figure 14:
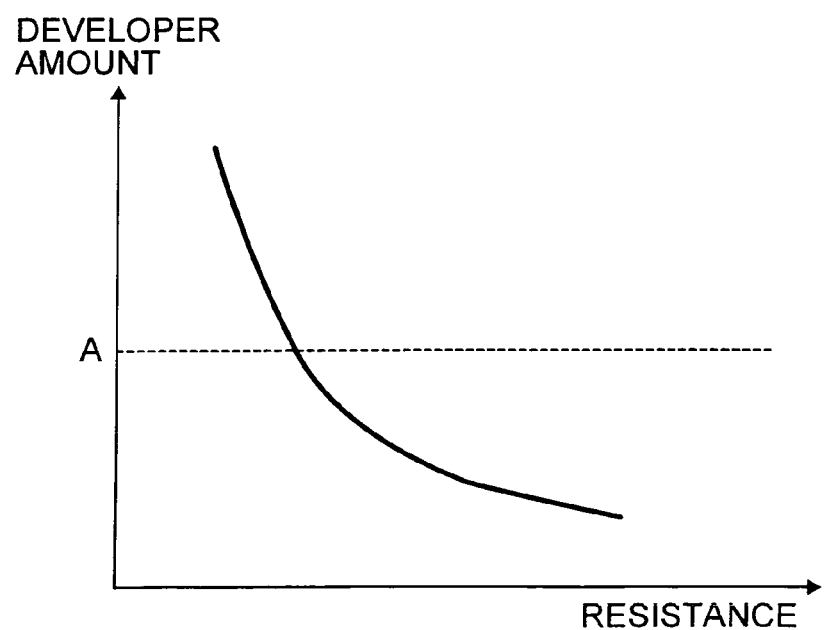
FIG. 14 is a graph showing a correlation of a resistance value between the developer carrying member and a developer regulating member and an amount of developer carried by the developer carrying member.

Referring to FIGS. 13A to 14, obtaining of the resistance between the developing sleeve and the developing blade 52 is described.

When the amount of developer on the developing sleeve is large, the developer directly under the developing blade 52 is thickly formed as shown in FIG. 13A, and thereby the developer volume sensor 88 may obtain a large number of magnetic brush per a unit area. Conversely, when the amount of developer on the developing sleeve is small, the developer directly under the developing blade 52 is thinly formed as shown in FIG. 13B, and thereby the developer volume sensor 88 may obtain a small number of magnetic brush per a unit area. According to the above-described results, it is determined that a specific resistance per a point of the magnetic brush is substantially identical to the other points thereof. Therefore, as shown in FIG. 14, when the amount of developer on the developing sleeve is large and the magnetic brush is thickly formed, the resistance between the developing sleeve and the developing blade 52 may be small. Conversely, when the amount of developer on the developing sleeve is small and the magnetic brush is thinly formed, the resistance between the developing sleeve and the developing blade 52 may be large.

Thus, when the amount of developer on the developing sleeve or the developer carrying member is obtained with a plurality of methods as described above and the deterioration of developer is detected, a detection having higher accuracy may be performed. The amount of developer on the developing sleeve or the developer carrying member may be obtained using a method other than the above-described methods. The amount of the developer on the developing sleeve or the developer carrying member may be obtained using the plurality of methods in combination that is not specifically limited. However, it is preferable the combination can achieve higher accuracy of detection. When a single and efficient accuracy can be obtained, it is not necessary to perform the plurality of methods in combination.

When the toner density is constant in detecting the amount of developer on the developing sleeve or the developer carrying member is constant, the accuracy in detection may increase. For example, when the toner density is the same as that of an initial amount of developer, the accuracy in detection may increase. More specifically, the accuracy in obtaining the reflection density may increase because the reflection density reflected by the magnetic brush becomes uniform. The accuracy in obtaining the height of the magnetic brush may increase because a volume of a toner particle is cancelled or ignored. The accuracy in obtaining the resistance between the developing sleeve and the developing blade 52 may increase because variations of specific resistance of a single magnetic brush become small.

The developer amount sensor 88 is disposed upstream of the developing blade 52 in the direction of the arrow E that is a direction to which the developer is conveyed by the developing roller 51. With the above-described structure, a detection may be performed at an average height of points of the magnetic brush, thereby preventing variations in detection conditions so that the accuracy of detection may increase in obtaining the reflection density, the height of points of the magnetic brush, and the specific resistance.

The developer amount sensor 88 serving as a reflection density sensor includes sensors having the same parts as the image density sensor 18. This allows the amount of developer on the developing sleeve or the developer carrying member to be detected without using additional parts, which can bring a reduction in cost.

With the above-described methods, an actual amount of developer on the developing sleeve or the developer carrying member is detected to compare with a lower limitation value A of a predetermined amount of developer on the developing sleeve or the developer carrying member, for example, see FIGS. 2 and 4. When the actual amount of developer is lower than or equal to the lower limitation value A, it is determined that the developer is deteriorated, thereby supplying the fresh developer. When the actual amount of developer is greater than the lower limitation value A, it is determine that the developer is not yet deteriorated and no supplying operation may be performed.

The developer amount sensor 88 may detect the deterioration of developer at the following points of time.

To detect the deterioration of developer with higher accuracy, the amount of developer on the developer sleeve or the developer carrying member may be detected at a point of time the developer is fully charged after the developing operation for a predetermined period of time, a period of time the charging operation is started, i.e. during a warm-up time, and/or after a predetermined period of time an amount of developer charge is reduced due to a stop of the charging operation. For the amount of developer obtained at the point of time when the charging is started and at the point of time when an amount of developer charge is reduced, the deterioration of developer may be determined based on the change in amounts of developer that rises or falls during a constant period of time.

More specifically, the deterioration of developer may be detected as follows.

First, the developing roller 51 and other developer delivering mechanisms such as the first and second conveying screws 53 and 54 stop a developer conveying operation including agitation and mixing, and the developer amount sensor 88 detects the amount of developer on the developing sleeve or the developer carrying member after a predetermined period of time from the stop of the developer conveying operation. Then, the developing roller 51 and the first and second conveying screws 53 and 54 resume the developer conveying operation, and the developer amount sensor 88 detects the amount of developer on the developing sleeve or the developer carrying member after a predetermined period of time from the start of resuming the developer conveying operation. Both amounts of developer detected by the developer amount sensor 88 may be compared to detect the deterioration of developer.

With the above-described detection, the change in developer charge in a period of agitation is cancelled or ignored because the developer has lower charge due to insufficient agitation, which cannot be counted as a cause of deterioration of the developer. Therefore, the high accuracy detection may be achieved.

Further, since the speed of charging and the amount of developer charge in insufficient agitation are different between fresh developer and deteriorated developer, the deterioration of developer may also be detected in high accuracy. That is, the above-described detection is performed focusing on differences in the speed of charging and the amount of developer charge according to a degree of deterioration of developer.

The deterioration of developer is generally detected when the developer is sufficiently agitated. However, there may be a case in which the fresh developer that is sufficiently agitated has a same amount of developer charge as the deteriorated developer that is also sufficiently agitated. While the developer conveying operation is not performed, the developer charge of the deteriorated developer may be lower than that of the fresh developer. Therefore, the developer charge of the developer not agitated may also be obtained as follows.

The developer amount sensor 88 detects the amount of developer on the developing sleeve or the developer carrying member before a warm-up operation at a power-on to the image forming apparatus 100. Then, the developer amount sensor 88 detects the amount of developer on the developing sleeve or the developer carrying member when the warm up is performed after the above-described detection. Both amounts of developer detected by the developer amount sensor 88 may be compared to detect the deterioration of developer.

Also with the above-described detection, the change in developer charge in a period of agitation is cancelled or ignored. Therefore, the high accuracy detection may be achieved.

Further, as described above, the speed of charging and the amount of developer charge in insufficient agitation are different between fresh developer and deteriorated developer, so the deterioration of developer may also be detected in high accuracy. Further, a period of time for the detection may be reduced to compensate for the warm up time.

The deterioration of developer may also be detected based on the condition of developer after stopping the developer conveying operation.

First, the developer amount sensor 88 detects the amount of developer on the developing sleeve or the developer carrying member while the developing roller 51 and other developer delivering mechanisms such as the first and second conveying screws 53 and 54 are performing the developer conveying operation including agitation and mixing. Then, the developer amount sensor 88 detects the amount of developer on the developing sleeve or the developer carrying member after a predetermined period of time from the stop of the developer conveying operation. Both amounts of developer detected by the developer amount sensor 88 may be compared to detect the deterioration of developer.

Thus, the deterioration of the developer may be detected in high accuracy when the developer charge decreases after stopping the developer conveying operation. That is, the above-described detection is performed focusing on a difference of the speed of discharging and the amount of developer charge according to a degree of deterioration of developer.

The deterioration of developer may also be detected based on a printing operation of the developing device 8 as follows.

The developer amount sensor 88 detects the amount of the developer on the developing sleeve or the developer carrying member when the image forming apparatus 100 performs the printing operation using the developing device 8. More specifically, the developer amount sensor 88 detects the amount of the developer on the developing sleeve or the developer carrying member at a point of time a predetermined number of images is output from the image forming apparatus 100. The detection of the amount of developer on the developing sleeve or the developer carrying member may be performed in synchronization with the output of image performed by the user, so a period of time for detection may be reduced.

Further, the detection may be performed with the developer amount sensor 88 when the developing roller 51 and other developer delivering mechanisms such as the first and second conveying screws 53 and 54 perform the developer conveying operation including agitation and mixing. This is because the change in developer charge in a period of agitation can be cancelled or ignored and the deterioration of developer can be detected when the developer has lower charge due to insufficient agitation. That is, the above-described detection is performed focusing on a difference of the speed of charging and the amount of developer charge according to a degree of deterioration of developer.

The detection may also be performed with the developer amount sensor 88 when the developer conveying operation is performed, and/or when the fresh toner is supplied, etc.

A combination of these detections may increase accuracy of detecting the amount of developer on the developer carrying member.

Now, it is preferable to understand that the amount of developer on the developer sleeve may be varied according to the condition of a surface roughness of the developing sleeve. The surface roughness of the developing sleeve depends on a forming of rough surface of the developing sleeve and an abrasion due to aging of the material.

According to the reason described above, it is preferable that a hardness of the surface of the developing sleeve be greater than that of the developer. The hard surface thereof may be achieved by coating the surface of the developing sleeve and/or carefully selecting the material of the developing sleeve. The developing sleeve having such a hard surface can avoid wear on the developing sleeve due to abrasion between the developing sleeve and developer, carrier in particular. The developing sleeve having such a surface can also prevent change in roughness thereof. With the above-described developing sleeve, a change of the amount of developer on the developing sleeve may be considered as a change of the amount of developer charge, thereby increasing accuracy of detection.

In a case in which the surface of the developing sleeve includes a soft material, a significant change in surface roughness can be estimated. To surely obtain the degree of the deterioration of developer based on the amount of developer on the developing sleeve, the deterioration of developer may be detected in accordance with a relationship between the period of the developer conveying operation performed by the developing roller 51 and the surface roughness of the developing sleeve, as shown in FIG. 15A, and a relationship between the surface roughness of the developing sleeve and the amount of developer on the developing sleeve, as shown in FIG. 15B.

More specifically, a relationship of the surface roughness of the developing sleeve and the amount of fresh developer of the developing sleeve is previously obtained. According to the above-described relationship, an amount of the fresh developer and an amount of the actual developer are compared under the condition that the surface roughness of the developing sleeve is identical so that the deterioration of developer can be detected.

Figure 15A:
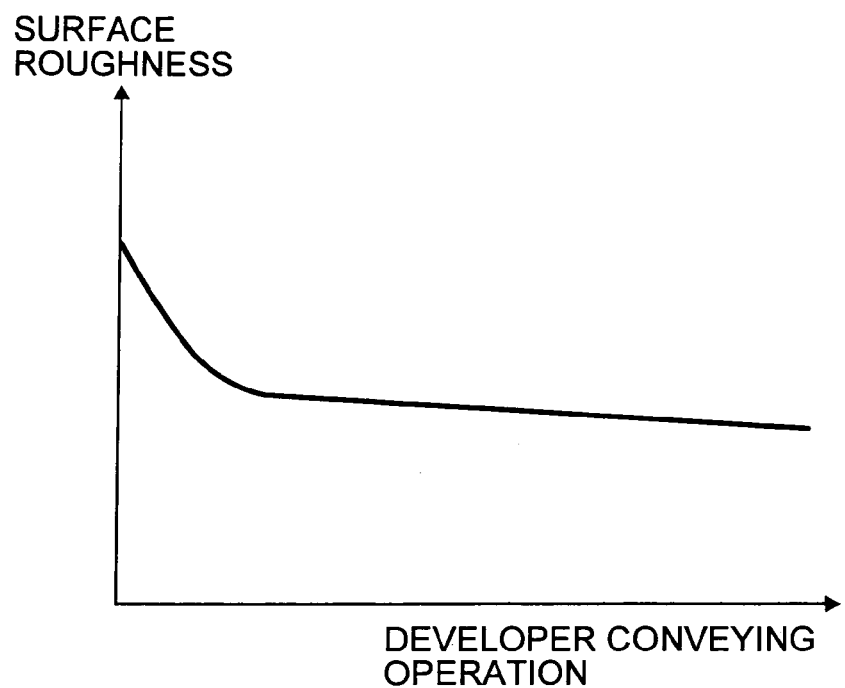
FIG. 15A is a graph showing a correlation between a drive time of the developing roller and a surface roughness of the developer carrying member.
Figure 15B:
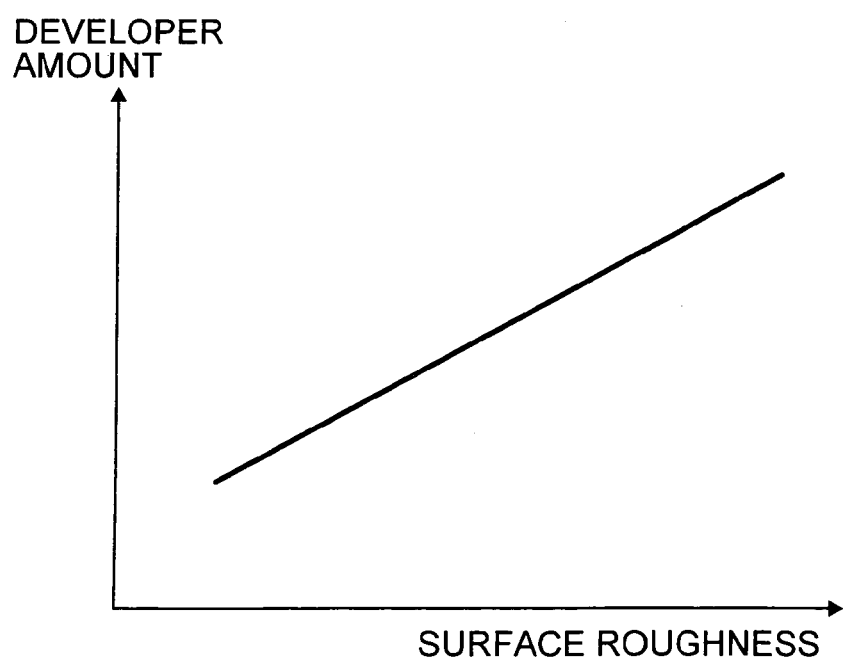
FIG. 15B is a graph showing a correlation between the surface roughness of the developer carrying member and an amount of developer carried by the developer carrying member.

According to the relationship as shown in FIG. 15A, the surface roughness of the developing sleeve can be obtained. According to the relationship as shown in FIG. 15B, the amount of fresh developer can be obtained based on the surface roughness obtained as described above. By comparison of the amount of the fresh developer with the amount of the actual developer, the amount of decrease of the developer charge can be obtained so that the deterioration of developer can be detected.

Before detecting the deterioration of developer, a developer rate R of the actual developer on the developing sleeve with respect to the amount of the fresh developer can be determined. The developer rate R is substantially a rate of the amount of developer charge of the actual developer obtained with respect to the amount of developer charge of the fresh developer. When a developer rate obtained based on results of the detection is equal to or less than the developer rate R, the fresh carrier may be supplied to the developer container 55. Thereby, the deterioration of developer can be detected under the condition the surface roughness of the developing sleeve may vary. With the above-described operation, a change of the amount of developer on the developing sleeve due to a difference of the amounts of developer charge and a change of the amount of developer on the developing sleeve due to a difference of the degree of the surface roughness can be determined, thereby detecting the deterioration of developer in high accuracy.

Further, the developing device 8 allows the user to control the supplying operation of the fresh carrier or the fresh developer, according to the same reasons as described above.

As previously described, the supplying mechanism supplying the fresh carrier includes the carrier cartridge 44, the carrier transportation path 45, the carrier conveying screw, the carrier transportation motor 46, and the connecting unit 40. The supplying mechanism may continuously supply the fresh carrier for a predetermined number of times. However, when deterioration of developer is still detected, the supplying mechanism stops the supplying operation and issues a warning through the display unit, also for the same reasons as described above. More specifically, when the amount of developer on the developer carrying member remains below a predetermined amount of developer even if the supplying operation is performed for the predetermined number of times, or when an unexpected value is obtained, the supplying operation may be stopped to issue the warning through the displaying unit.

As described above, the developing device 8 includes the developer amount sensor 88 and can perform the detection of the deterioration of developer based on the above-described characteristics of the developer.

The following show the methods using the torque sensor, the image density sensor 18, and the toner scattering sensor 89.

The image density sensor 18 is a detecting mechanism to detect an amount of insufficiently charged toner.

The toner scattering sensor 89 is disposed in a vicinity of the outside of the developer container 55, below the developer container 55, and downstream of an area opposite to the photoconductive element 5 in the rotation direction of the developing sleeve. As an alternative, the toner scattering sensor 89 can be disposed at a position above the developer container 55 or upstream of an area opposite to the photoconductive element 5 in the rotation direction of the developing sleeve.

Figure 16:
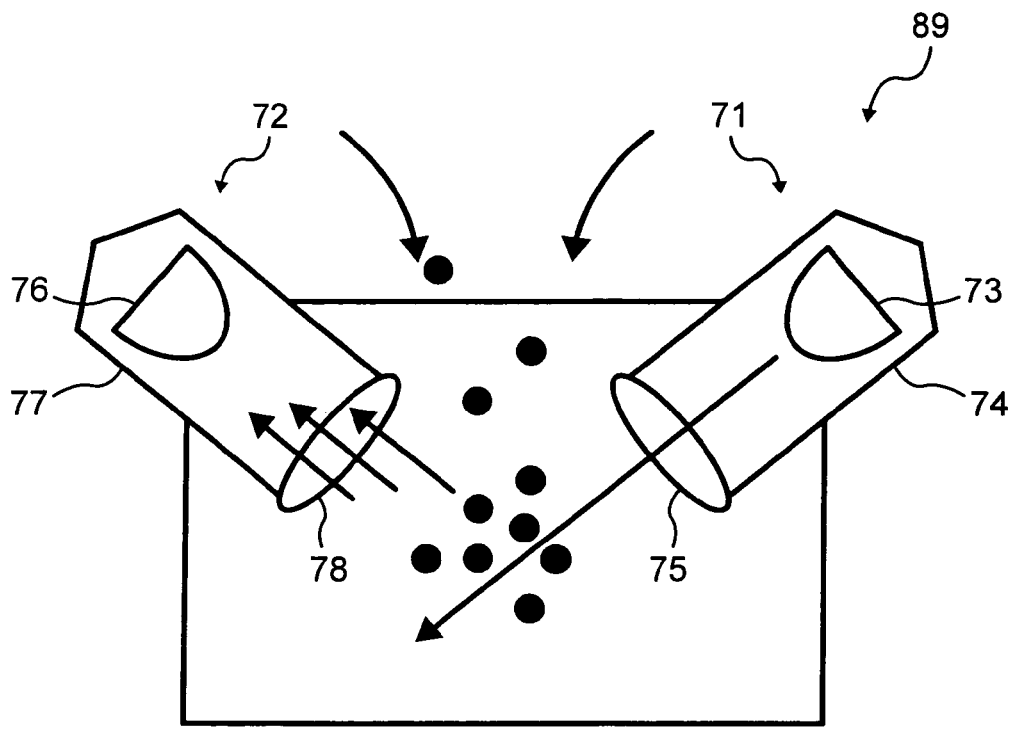
FIG. 16 is a schematic structure of a toner scattering sensor included in the developing device of FIG. 2.

As shown in FIG. 16, the toner scattering sensor 89 includes a light emitting unit 71 and a light receiving unit 72.

The light emitting unit 71 emits a light beam, and includes a light emitting element 73, a housing 74 for the light emitting element 73, and a lens 75 that is disposed at a position covering an opening of the housing 74 in which the light beam emitted by the light emitting element 73 passes out from the housing 74. The light receiving unit 72 receives the light beam emitted by the light emitting unit 71 and reflected from scattered toner. The light receiving unit 72 includes a light receiving element 76, a housing 77 for the light receiving element 77, and a lens 78 that is disposed at a position covering an opening of the housing 77 in which the reflected light beam comes through.

When toner scattering occurs, the scattered toner passes between the light emitting unit 71 and the light receiving unit 72 included in the toner scattering sensor 89. At this time, the light beam emitted from the light emitting element 73 of the light emitting unit 71 is reflected by scattered toner. The light beam reflected by the scattered toner is received by the light receiving element 76 of the light receiving unit 72. The reflected light beam is read, is converted into an electric signal, and is output. The lens 75 is used to improve an efficiency of an outgoing light from the light emitting element 73, and the lens 78 is used to improve an efficiency of an incident light to the light receiving element 76.

Figure 17:
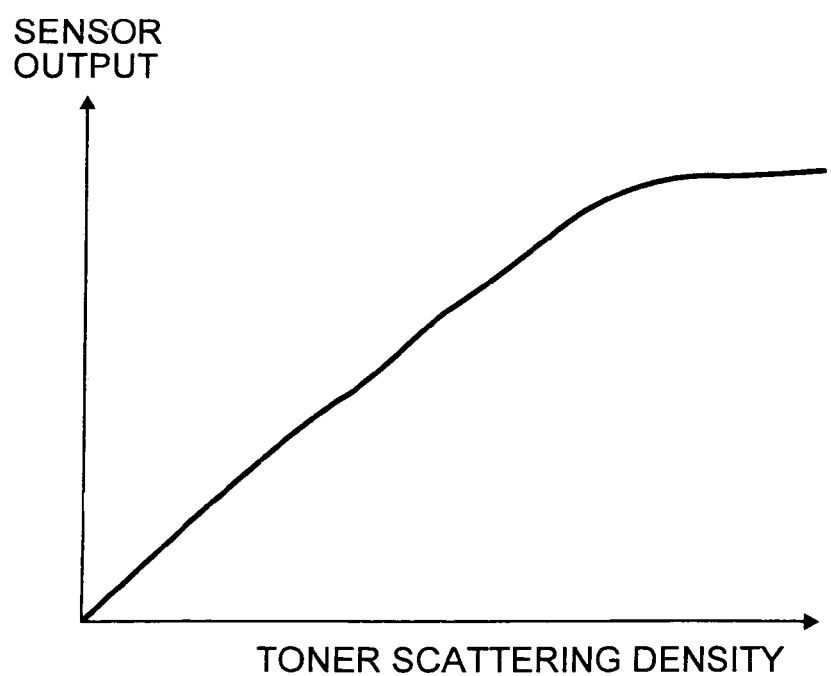
FIG. 17 shows a correlation between a toner scattering density and an output of the toner scattering sensor of FIG. 16.

The result of detection of toner scattering performed by the toner scattering sensor 89 is shown in FIG. 17.

The torque sensor obtains torque values of the first and second conveying screws 53 and 54 during the developer conveying operation, and detects the deterioration of developer based on the fluidity of developer.

The deterioration of developer is detected as the deterioration of carrier. More specifically, the image density sensor 18 and the toner scattering sensor 89 detect a degree of deterioration of developer and the torque sensor detects a degree of deterioration of toner, so that a degree of deterioration of carrier can be estimated and the deterioration of developer may be detected based on the deterioration of carrier.

In this embodiment, the deterioration of developer, more specifically the deterioration of toner and carrier, is detected using the image density sensor 18 together with the toner scattering sensor 89, but the present invention is not limited to the detection using these two sensors 18 and 89. An embodiment of the present invention can detect deterioration of toner and carrier using only either one of the image density sensor 18 and the toner scattering sensor 89. The image density sensor 18 detects background contamination on an area other than the image area, i.e. on a background area in a which no image is formed on the recording sheet. The toner scattering sensor 89 detects an amount of scattered toner. Background contamination and toner scattering may occur due to insufficiently charged toner or oppositely charged toner. These toners may adhere to non-image areas on the surface of the photoconductive element 5 or may depart from carrier in the magnetic brush formed by centrifugal force generated by rotation of the developing sleeve, resulting in scattering out of the developer container 55.

Generally, an amount of insufficiently charged toner and that of oppositely charged toner in developer tend to increase with age because of stress applied by the developer when the image forming operation is repeatedly performed. The amount of developer charge may be reduced due to a condition of toner or carrier.

Toner is mixed with an additive agent to improve fluidity, secure the amount of toner charge, and improve anti-electric stability against environmental variations. However, when the toner is repeatedly agitated, the additive agent may be separated from a toner particle or may be buried into a toner particle, which results in degradation of charging ability. A charging control agent contained in a toner particle may also deteriorate due to stress and degrade the charging ability.

When carrier is repeatedly agitated, abrasion and collision with toner may continuously occur, and a portion of a toner particle may adhere to a carrier particle, resulting in contamination on the surface of the carrier particle and peeling of a coat layer of the carrier particle. This is why the charging ability of carrier with respect to toner degrades.

As described above, a single toner particle may deteriorate because agitation of developer allows the additive agent to be separated from or be buried into the toner particle. The reduction of the additive agent increases adhesion between the toner particles and between the toner particle and the carrier particle, resulting in fluidity reduction of toner. Therefore, a detection of a change in fluidity of toner can obtain a degree of deterioration of toner. As the fluidity of toner decreases, a load for agitating developer may increase. So, if the torque sensor can obtain the load of a developing unit, the change of fluidity of toner can be obtained, thereby detecting deterioration of toner.

It is desirable that this detection of deterioration of toner be performed under the condition with a constant toner density, for example, when the initial angle of the slope is measured. This is because the fluidity of developer may depend on the toner density. Therefore, the measurement of deterioration of toner in the constant toner density may prevent adverse effects to the toner density.

Figure 18:
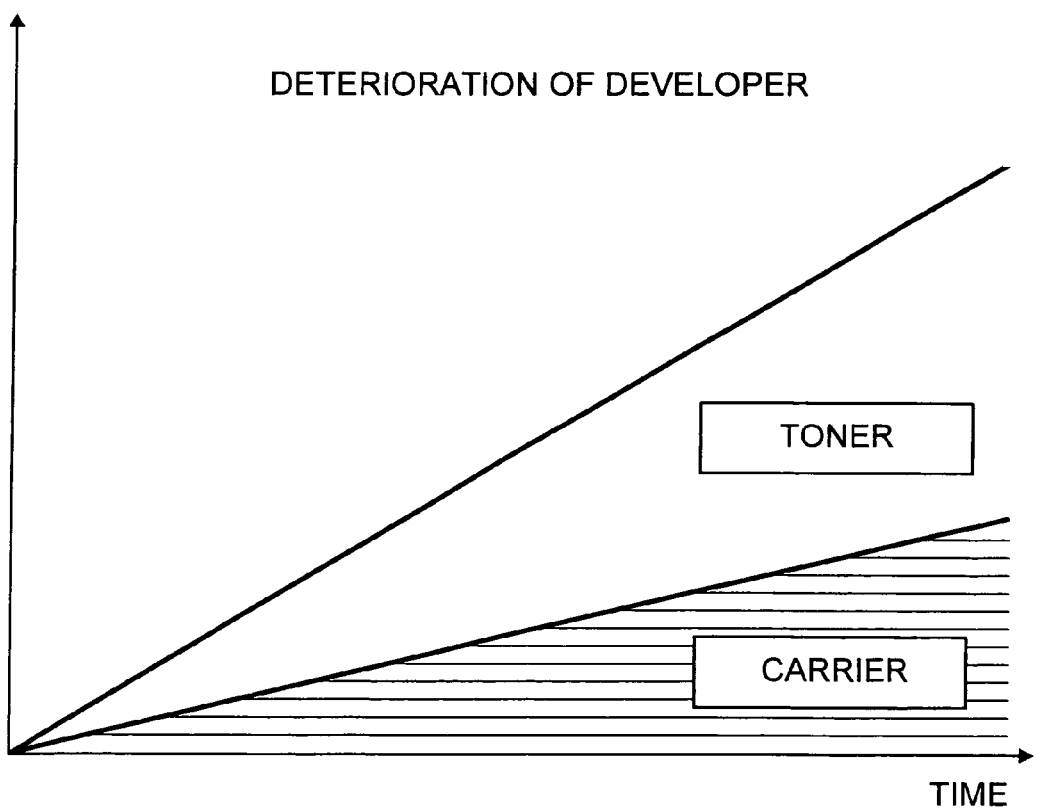
FIG. 18 is a graph showing respective degrees of deterioration of developer including toner and carrier, based on a relative relationship of degrees of failures such as toner scattering and contamination and a period of time.

As shown in FIG. 18, a degree of deterioration of developer obtained by detections of amounts of toner scattering and background contamination may include deteriorations of carrier and of toner. If the degrees of deteriorations of developer and toner are obtained, a degree of deterioration of carrier may also be obtained. More specifically, a correlation of a value of deterioration of the toner with flesh carrier and a value of deterioration of the entire developer due to background contamination and toner scattering is previously obtained. Then, the value of deterioration of the toner is subtracted from the value of the deterioration of the entire developer, so that the degree of deterioration of carrier can be obtained. According to the degree of deterioration of carrier obtained as described above, the fresh carrier may be supplied and the carrier having lower charging ability previously in the developing device 8 may be discharged from the developing device 8. Thus, the carrier in the developer device 8 may be replaced, which can produce images having a constant image quality and minimize the amount of carrier to be used.

As described above, the developing device 8 includes the torque sensor, the image density sensor 18, and the toner scattering sensor 89, and can perform the detection of the deterioration of developer based on the above-described characteristics of the developer.

Further, the developing device 8 allows the user to control the supplying operation of the fresh carrier or the fresh developer, for the same reasons as described above.

As previously described, the supplying mechanism supplying the fresh carrier includes the carrier cartridge 44, the carrier transportation path 45, the carrier conveying screw, the carrier transportation motor 46, and the connecting unit 40. The supplying mechanism may continuously supply the fresh carrier for a predetermined number of times. However, when deterioration of developer is still detected, the supplying mechanism stops the supplying operation and issues a warning through the display unit, also for the same reasons as described above.

The above-described structure of the toner detecting mechanism employs the torque sensor, but the present invention is not limited to such a toner detecting mechanism. As an alternative, the toner density sensor 90 can be employed to detect the fluidity of developer agitated and conveyed by the first and second conveying screws 53 and 54.

The above-described embodiments show the developing device 8, the detecting mechanism, the detecting methods of deterioration of developer, the image forming apparatus 100, and the image forming method, but the present invention is not limited to such methods, devices, and apparatuses, except when specified in the above-described embodiments.

For example, the detection method of deterioration of developer may use at least one of the toner density sensor 90, the developer amount sensor 88, the torque sensor, the image density sensor 18, and the toner scattering sensor 89.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

The invention claimed is:

1. A developing device, comprising:
   a developer container configured to contain a developer including a toner and a carrier;
   a developer delivering mechanism configured to deliver the developer toward an image bearing member of an image forming apparatus; and
   a detecting mechanism configured to detect deterioration of the developer based on a predetermined characteristic of the developer, wherein:
   the detecting mechanism comprises a toner density sensor with a detecting portion configured to obtain a toner density of the toner by detecting magnetic permeability of the developer; and
   the detecting mechanism detects the deterioration of the developer based on an output waveform of the toner density obtained by the toner density sensor.

2. The developing device according to claim 1, further comprising:
   a removing member configured to remove the developer adhered on the detecting portion of the toner density sensor, and wherein:
   the toner density sensor detects the deterioration of the developer based on the output waveform of the toner density that varies when the removing member removes the developer from the detecting portion of the toner density sensor.

3. The developing device according to claim 2, wherein:
   the toner density sensor detects the deterioration of the developer based on a first output waveform having a first slope formed between a first peak value and a first bottom value thereof and a second output waveform having a second slope formed between a second peak value and a second bottom value thereof.

4. The developing device according to claim 2, wherein:
   the toner density sensor detects the deterioration of the developer based on a first output waveform having a first period of time between a first peak value and a first bottom value thereof and a second output waveform having a second period of time between a second peak value and a second bottom value thereof.

5. The developing device according to claim 2, wherein:
   the toner density sensor detects the deterioration of the developer based on a first output waveform having a first output value thereof obtained at a first predetermined point of time and a second output waveform having a second output value thereof obtained after a second predetermined period of time from the first predetermined point of time.

6. The developing device according to claim 2, wherein:
   the toner density sensor detects the deterioration of the developer based on the output waveform of the toner density obtained when the developer is fresh.

7. The developing device according to claim 2, wherein:
   the developer delivering mechanism comprises a conveying screw configured to convey the developer; and
   the removing member is integrally mounted on the conveying screw.

8. The developing device according to claim 7, wherein:
   the detecting portion of the toner density sensor is disposed at a bottom portion of an inner wall of the developer container, in which the removing member contacts with the developer contained in the developer container.

9. The developing device according to claim 1, wherein:
   the detecting mechanism performs a detecting operation under a condition in which a constant toner density is maintained.

10. A developing device, comprising:
    a developer container configured to contain a developer including a toner and a carrier;
    a developer delivering mechanism configured to deliver the developer toward an image bearing member of an image forming apparatus; and
    a detecting mechanism configured to detect deterioration of the developer based on a predetermined characteristic of the developer, wherein:
    the developer delivering mechanism comprises a developer carrying member configured to carry the toner contained in the developer to the image bearing member;
    the detecting mechanism comprises a developer amount sensor configured to obtain an amount of the developer carried on a surface of the developer carrying member; and
    the detecting mechanism detects the deterioration of the developer based on the detected amount of the developer.

11. The developing device according to claim 10, wherein:
    the developer amount sensor detects the deterioration of the developer based on a first amount of the developer obtained after a first period of time from when the developer carrying member stops a delivering operation of the developer and a second amount of the developer obtained after a second period of time from when the developer carrying member resumes the delivering operation of the developer.

12. The developing device according to claim 10, wherein:
the developer amount sensor detects the deterioration of the developer based on a first amount of the developer obtained prior to a warm-up operation at a power-on of the image forming apparatus and a second amount of the developer obtained in the warm-up operation of the image forming apparatus.

13. The developing device according to claim 10, wherein:
the developer amount sensor detects the deterioration of the developer based on a first amount of the developer obtained after a first period of time from when the developer carrying member performs a delivering operation of the developer and a second amount of the developer obtained after a second period of time from when the developer carrying member stops the delivering operation of the developer.

14. The developing device according to claim 10, wherein:
the developer amount sensor detects the deterioration of the developer based on the amount of the developer obtained after a predetermined number of printouts are output.

15. The developing device according to claim 10, wherein:
the developer amount sensor detects the deterioration of the developer based on the amount of the developer obtained after a predetermined period of time from when the developer carrying member performs a delivering operation of the developer.

16. The developing device according to claim 10, wherein:
the developer amount sensor detects the deterioration of the developer vased on the amount of the developer obtained by performing a plurality of detections in combination.

17. The developing deice according to claim 10, wherein:
the developer amount sensor includes a sensor having a same structure as an image density sensor included in the image forming apparatus.

18. The developing device according to claim 10, further comprising a regulating memmber configure to regulate an amount of the developer carried by the developer carryng member, and wherein:
the developer amount sensor is disposed downstream of the regulating member in a derection to which the developer is delivered by the developer carrying member.

19. The developing device according to claim 10, wherein:
the developer carrying member includes a surface having a material harder than the developer.

20. The developing device accorfing to claim 10, wherein:
the developer amount sensor detects the deterioration of the developer in accordance with a relationship between a developer conveying aperation of the developer carrying member and a surface roughness of the developer carrying member and a relationship between the surface roughness and the amount of the developer obtained by the develaper amount sensor.

21. A developing device, comprising:
a developer container configured to containg a developer including a toner and a carrier;
a developer delivering mechanism configured to deliver the developer toward an image bearing member of an image forming apparatus; and
a detecting mechanism configured to detect deterioration of the developer based on a predetermined characteristic of the developer, wherein:
the detecting mechanism comprises:
a developer deterioration sensor configured to obtain a degree of deterioration of the developer; and
a toner deterioration sensor configured to obtain a degree of deterioration of the toner included in the developer, and wherein:
the deterioration of the developer is detected based on the degree of the deterioration of the developer and the degree of deterioration of the toner.

22. The developing device according to claim 21, wherein:
the detecting mechanism detects the deterioration of the toner based on a fluidity of the developer delivered by the developer delivering mechanism.

23. The developing device according to claim 21, wherein:
the developer deterioration sensor includes a background contamination sensor configured to obtain an amount of a contamination on a surface of the image bearing member.

24. The developing device according to claim 23, wherein:
the background contamination sensor includes a reflection density sensor.

25. The developing device according to claim 21, wherein:
the developer deterioration sensor includes a toner scattering sensor configured to obtain an amount of the toner scattering out of the developing device.

26. The developing device according to claim 25, wherein:
the toner scattering sensor includes an optical sensor comprising:
a light emitting portion configured to emit a light beam; and
a light receiving portion configured to receive the light beam emitted by the light emitting portion, and thereafter reflected by the toner scattering out of the developing device.

27. A developing device, comprising:
a developer container configured to contain a developer including a toner and a carrier;
a developer delivering mechanism configured to deliver the developer toward an image bearing member of an image forming apparatus;
a detecting mechanism configured to detect deterioration of the developer based on a predetermined characteristic of the developer;
a supplying mechanism configured to supply fresh developer including one of fresh carrier and a mixture of fresh toner and the fresh carrier to the developer container when the deterioration of the developer is detected; and
a collecting mechanism configured to collect excess developer, wherein:
a user is allowed to control a supplying operation performed by the supplying mechanism.

28. A developing device, comprising:
a developer container configured to contain a developer including a toner and a carrier;
a developer delivering mechanism configured to deliver the developer toward an image bearing member of an image forming apparatus;
a detecting mechanism configured to detect deterioration of the developer based on a predetermined characteristic of the developer;
a supplying mechanism configured to supply fresh developer including one of fresh carrier and a mixture of fresh toner and the fresh carrier to the developer container when the deterioration of the developer is detected; and
a collecting mechanism configured to collect excess developer, wherein;
the supplying mechanism stops the supplying operation to issue a warning to the user when the deterioration of the developer is detected after the supplying mechanism repeatedly supplies the fresh developer for a predetermined number of times.

29. A developing device, comprising:
means for containing a developer including a toner and a carrier;
means for delivering the developer toward an image bearing member of an image forming apparatus; and
means for detecting deterioration of the developer based on a predetermined characteristic of the developer, wherein:
the means for detecting comprises means for obtaining a toner density of the toner with a detecting portion by detecting magnetic permeability of the developer; and
the means for detecting detects the deterioration of the developer based on an output waveform of the obtained toner density.

30. The developing device according to claim 29, further comprising:
means for removing the developer adhered on the detecting portion of the means for obtaining, and wherein:
the means for obtaining detects the deterioration of the developer based on a characteristic of the output waveform of the toner density that varies when the means for removing removes the developer from the detection portion of the means for obtaining.

31. The developing device according to claim 30, wherein:
the means for obtaining detects the deterioration of the developer based on the output waveform obtained when the developer is fresh.

32. The developing device according to claim 29, wherein:
the means for detecting performs a detecting operation under a condition in which a constant toner density is maintained.

33. The developing device according to claim 29, further comprising:
means for supplying fresh developer including one of fresh carrier and a mixture of fresh toner and the fresh carrier to the means for containing when the deterioration of the developer is detected; and
means for collecting excess developer.

34. A developing device, comprising:
means for containing a developer including a toner and a carrier;
means for delivering the developer toward an image bearing member of an image forming apparatus; and
means for detecting deterioration of the developer based on a predetermined characteristic of the developer, wherein:
the means for delivering comprises means for carrying the toner contained in the developer to the image bearing member;
the means for detecting comprises means for obtaining an amount of the developer carried by the means for carrying; and
the means for detecting detects the deterioration of the developer based on the amount of the developer.

35. The developing device according to claim 34, wherein:
the means for obtaining detects the deterioration of the developer in accordance with a relationship between a developer conveying operation performed by the means for carrying and a surface roughness of the means for carrying and a relationship between the surface roughness and the amount of the developer obtained by the means for obtaining.

36. A developing device, comprising:
means for containing a developer including a toner and a carrier;
means for delivering the developer toward an image bearing member of an image forming apparatus; and
means for detecting deterioration of the developer based on a predetermined characteristic of the developer, wherein:
the means for detecting comprises:
first means for obtaining a degree of deterioration of the developer; and
second means for obtaining a degree of deterioration of the toner included in the developer, and wherein:
the deterioration of the developer is detected based on the degree of the deterioration of the developer and the degree of deterioration of the toner.

37. The developing device according to claim 36, wherein:
the second means for obtaining detects the deterioration of the toner based on a fluidity of the developer delivered by the means for delivering.

38. A method of detecting deterioration of developer, comprising:
filling a developer including a toner and a carrier in a developing device;
delivering the developer toward an image bearing member disposed in a vicinity of the developing device; and
detecting deterioration of the developer based on a predetermined characteristic of the developer, wherein:
the detecting comprises:
removing the developer adhered on a detecting portion;
obtaining a toner density of the toner by magnetic permeability; and
detecting the deterioration of the developer based on an output waveform of the toner density.

39. The method according to claim 38, further comprising:
supplying fresh developer including one of fresh carrier and a mixture of fresh toner and the fresh carrier when the deterioration of the developer is detected; and
collecting excess developer.

40. A method of detecting deterioration of developer, comprising:
filling a developer including a toner and a carrier in a developing device;
delivering the developer toward an image bearing member disposed in a vicinity of the developing device; and detecting deterioration of the developer based on a predetermined characteristic of the developer, wherein:

the delivering comprises:
providing a developer carrying member; and
delivering the toner contained in the developer to the developer carrying member; and the detecting comprises:
obtaining an amount of the developer on a surface of the developer carrying member; and
detecting the deterioration of the developer based on the amount of the developer.

* * * * *